United States Patent
Wang et al.

(10) Patent No.: US 12,025,061 B2
(45) Date of Patent: Jul. 2, 2024

(54) GAS TURBINE ENGINE WITH FUEL CELL ASSEMBLY

(71) Applicant: General Electric Company, Schenectady, NY (US)

(72) Inventors: Honggang Wang, Clifton Park, NY (US); Michael Anthony Benjamin, Cincinnati, OH (US); Stefan Joseph Cafaro, Chapel Hill, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/712,747

(22) Filed: Apr. 4, 2022

(65) Prior Publication Data

US 2023/0313744 A1 Oct. 5, 2023

(51) Int. Cl.
| | | |
|---|---|---|
| F02C 9/40 | (2006.01) | |
| F02C 7/32 | (2006.01) | |
| F02C 9/48 | (2006.01) | |
| F23R 3/36 | (2006.01) | |

(52) U.S. Cl.
CPC .................. *F02C 9/40* (2013.01); *F02C 7/32* (2013.01); *F02C 9/48* (2013.01); *F23R 3/36* (2013.01); *F05D 2220/323* (2013.01); *F05D 2220/76* (2013.01); *F05D 2270/304* (2013.01); *F05D 2270/31* (2013.01)

(58) Field of Classification Search
CPC ...... F02C 9/40; F02C 7/32; F02C 9/48; F23R 3/36; F05D 2220/323; F05D 2220/76; F05D 2270/304; F05D 2270/31
See application file for complete search history.

(56) References Cited

U.S. PATENT DOCUMENTS

| | | |
|---|---|---|
| 3,658,279 A | 4/1972 | Robertson |
| 3,805,517 A | 4/1974 | Sewell et al. |
| 4,684,081 A | 8/1987 | Cronin |
| 5,227,256 A | 7/1993 | Marianowski et al. |
| 5,581,995 A | 12/1996 | Lucenko et al. |
| 5,858,314 A | 1/1999 | Hsu et al. |

(Continued)

FOREIGN PATENT DOCUMENTS

| | | |
|---|---|---|
| CA | 2446360 A1 | 4/2004 |
| CN | 100367556 C | 2/2008 |

(Continued)

OTHER PUBLICATIONS

Babu D et al., Optimization of Pattern Factor of the Annular Gas Turbine Combustor for Better Turbine Life, IOSR Journal of Mechanical and Civil Engineering, pp. 30-35.

(Continued)

*Primary Examiner* — Gerald L Sung
*Assistant Examiner* — Rene D Ford
(74) *Attorney, Agent, or Firm* — Dority & Manning, P.A.

(57) ABSTRACT

A method of operating a gas turbine engine is provided. The method includes: providing a flow of a primary fuel to a combustor of a turbomachine, the turbomachine including a compressor, a turbine, and a spool rotatable with the compressor and the turbine; receiving data indicative of a spool parameter of the spool; and modifying a flow of a secondary fuel to the combustor in response to the received data indicative of the spool parameter of the spool.

12 Claims, 8 Drawing Sheets

(56) References Cited

U.S. PATENT DOCUMENTS

| | | | |
|---|---|---|---|
| 5,968,680 A | 10/1999 | Wolfe et al. | |
| 6,183,703 B1 | 2/2001 | Hsu et al. | |
| 6,296,957 B1 | 10/2001 | Graage | |
| 6,348,278 B1 | 2/2002 | LaPierre et al. | |
| 6,630,264 B2 | 10/2003 | Haltiner, Jr. et al. | |
| 6,641,084 B1 | 11/2003 | Huber et al. | |
| 6,834,831 B2 | 12/2004 | Daggett | |
| 7,239,035 B2 | 7/2007 | Garces et al. | |
| 7,279,243 B2 | 10/2007 | Haltiner, Jr. et al. | |
| 7,285,350 B2 | 10/2007 | Keefer et al. | |
| 7,380,749 B2 | 6/2008 | Fucke et al. | |
| 7,456,517 B2 | 11/2008 | Campbell et al. | |
| 7,470,477 B2 | 12/2008 | Zizelman et al. | |
| 7,513,119 B2 | 4/2009 | Zielinski et al. | |
| 7,578,136 B2 | 8/2009 | Derouineau et al. | |
| 7,659,021 B2 | 2/2010 | Horiuchi et al. | |
| 7,709,118 B2 | 5/2010 | Lundberg | |
| 7,743,499 B2 | 6/2010 | Pettit et al. | |
| 7,781,115 B2 | 8/2010 | Lundberg | |
| 7,854,582 B2 | 12/2010 | Ullyott | |
| 7,926,287 B2 | 4/2011 | Ullyott et al. | |
| 7,966,801 B2 | 6/2011 | Umeh et al. | |
| 7,966,830 B2 | 6/2011 | Daggett | |
| 8,141,360 B1 | 3/2012 | Huber | |
| 8,232,670 B2 | 7/2012 | Breit et al. | |
| 8,268,510 B2 | 9/2012 | Rock et al. | |
| 8,288,060 B2 | 10/2012 | Bae et al. | |
| 8,309,270 B2 | 11/2012 | Finnerty et al. | |
| 8,373,381 B2 | 2/2013 | Raiser et al. | |
| 8,394,552 B2 | 3/2013 | Gummalla et al. | |
| 8,524,412 B2 | 9/2013 | Rock et al. | |
| 8,722,270 B2 | 5/2014 | Pastula et al. | |
| 8,727,270 B2 | 5/2014 | Burns et al. | |
| 8,732,532 B2 | 5/2014 | Higeta | |
| 8,820,677 B2 | 9/2014 | Rajashekara et al. | |
| 8,846,255 B2 | 9/2014 | Dineen | |
| 8,875,519 B2 | 11/2014 | Dooley | |
| 8,950,703 B2 | 2/2015 | Bayliss et al. | |
| 9,005,847 B2 | 4/2015 | Rock et al. | |
| 9,028,990 B2 | 5/2015 | Gans et al. | |
| 9,054,385 B2 | 6/2015 | Jones et al. | |
| 9,059,440 B2 | 6/2015 | Hotto | |
| 9,068,748 B2 | 6/2015 | Hoke | |
| 9,118,054 B2 | 8/2015 | Gummalla et al. | |
| 9,347,379 B2 | 5/2016 | Dooley | |
| 9,359,956 B2 | 6/2016 | Dooley | |
| 9,435,230 B2 | 9/2016 | Kim et al. | |
| 9,444,108 B2 | 9/2016 | Brousseau | |
| 9,464,573 B2 | 10/2016 | Remy et al. | |
| 9,541,001 B2 | 1/2017 | Steinwandel et al. | |
| 9,604,730 B2 | 3/2017 | Hagh et al. | |
| 9,617,006 B2 | 4/2017 | Brugger et al. | |
| 9,666,888 B2 | 5/2017 | Nagai et al. | |
| 9,777,638 B2 | 10/2017 | Freidl | |
| 9,897,041 B2 | 2/2018 | Hoffjann et al. | |
| 9,966,619 B2 | 5/2018 | Libis et al. | |
| 10,008,726 B2 | 6/2018 | Leah et al. | |
| 10,035,607 B2 | 7/2018 | Wangemann et al. | |
| 10,069,150 B2 | 9/2018 | Mata et al. | |
| 10,224,556 B2 | 3/2019 | Lents et al. | |
| 10,318,003 B2 | 6/2019 | Gannon et al. | |
| 10,443,504 B2 | 10/2019 | Dalal | |
| 10,446,858 B2 | 10/2019 | Palumbo et al. | |
| 10,487,839 B2 | 11/2019 | Kupiszewski et al. | |
| 10,622,653 B2 | 4/2020 | Whyatt et al. | |
| 10,641,179 B2 | 5/2020 | Hayama et al. | |
| 10,644,331 B2 | 5/2020 | Stoia et al. | |
| 10,671,092 B2 | 6/2020 | DiRusso et al. | |
| 10,676,208 B2 | 6/2020 | Wangemann et al. | |
| 10,724,432 B2 | 7/2020 | Shapiro et al. | |
| 10,737,802 B2 | 8/2020 | Krug et al. | |
| 10,762,726 B2 | 9/2020 | Gansler et al. | |
| 10,766,629 B2 | 9/2020 | Mercier-Calvairac et al. | |
| 10,774,741 B2 | 9/2020 | Sennoun | |
| 10,814,992 B2 | 10/2020 | Halsey et al. | |
| 10,913,543 B2 | 2/2021 | Bailey et al. | |
| 10,919,635 B2 | 2/2021 | Edgar et al. | |
| 10,941,940 B2 | 3/2021 | Bulat et al. | |
| 10,950,875 B1 | 3/2021 | Radhakrishnan et al. | |
| 10,967,984 B2 | 4/2021 | Willford et al. | |
| 10,978,723 B2 | 4/2021 | Lo et al. | |
| 2002/0163819 A1 | 11/2002 | Treece | |
| 2004/0081871 A1 | 4/2004 | Kearl et al. | |
| 2004/0150366 A1 | 8/2004 | Ferrall et al. | |
| 2004/0224268 A1 | 11/2004 | Keller et al. | |
| 2006/0010866 A1 | 1/2006 | Rehg et al. | |
| 2008/0155984 A1 | 7/2008 | Liu et al. | |
| 2008/0276620 A1* | 11/2008 | Ullyott | F01D 21/06 60/773 |
| 2010/0133475 A1 | 6/2010 | Kobayashi et al. | |
| 2010/0159303 A1 | 6/2010 | Rock et al. | |
| 2011/0071707 A1 | 3/2011 | Crumm et al. | |
| 2012/0161512 A1 | 6/2012 | Metzler et al. | |
| 2012/0301814 A1 | 11/2012 | Beasley et al. | |
| 2013/0099560 A1 | 4/2013 | Shipley et al. | |
| 2013/0280634 A1 | 10/2013 | Park et al. | |
| 2014/0023945 A1 | 1/2014 | Epstein et al. | |
| 2014/0325991 A1 | 11/2014 | Liew et al. | |
| 2015/0030947 A1 | 1/2015 | Saunders et al. | |
| 2015/0151844 A1 | 6/2015 | Anton et al. | |
| 2015/0337742 A1 | 11/2015 | Bernero et al. | |
| 2016/0076461 A1* | 3/2016 | Kawai | B64D 37/30 60/39.463 |
| 2016/0260991 A1 | 9/2016 | Shapiro et al. | |
| 2017/0070088 A1 | 3/2017 | Bernsten et al. | |
| 2018/0003072 A1 | 1/2018 | Lents et al. | |
| 2018/0141675 A1 | 5/2018 | Halsey et al. | |
| 2018/0166734 A1 | 6/2018 | Linde et al. | |
| 2018/0319283 A1 | 11/2018 | Battin et al. | |
| 2019/0121369 A1 | 4/2019 | DiRusso et al. | |
| 2019/0136761 A1 | 5/2019 | Shapiro et al. | |
| 2019/0145273 A1 | 5/2019 | Frank et al. | |
| 2019/0186744 A1 | 6/2019 | Lowery et al. | |
| 2020/0014044 A1 | 1/2020 | Tichy et al. | |
| 2020/0062414 A1 | 2/2020 | Hon et al. | |
| 2020/0136163 A1 | 4/2020 | Holland et al. | |
| 2020/0149479 A1 | 5/2020 | Des Roches-Dionne et al. | |
| 2020/0194799 A1 | 6/2020 | Hart et al. | |
| 2020/0313207 A1 | 10/2020 | Milcarek et al. | |
| 2021/0003281 A1 | 1/2021 | Amble et al. | |
| 2021/0075034 A1 | 3/2021 | Irie et al. | |
| 2021/0115857 A1 | 4/2021 | Collopy | |

FOREIGN PATENT DOCUMENTS

| | | | |
|---|---|---|---|
| CN | 106976405 A | 7/2017 | |
| DE | 102005012230 A1 | 10/2005 | |
| DE | 10200950812 B4 | 4/2017 | |
| EP | 2800186 B1 | 2/2018 | |
| EP | 3336948 B1 | 9/2019 | |
| EP | 3805107 A1 | 4/2021 | |
| JP | 2009187756 A | 8/2009 | |
| JP | 2011002308 A | 1/2011 | |
| JP | 2018087501 A | 6/2018 | |
| KR | 20090064853 A | 6/2009 | |
| WO | WO9965097 A1 | 12/1999 | |
| WO | WO2018108962 A1 | 6/2018 | |
| WO | WO2019160036 A1 | 8/2019 | |
| WO | WO2020/011380 A1 | 1/2020 | |

OTHER PUBLICATIONS

Cocker et al., 3D Printing Cuts Fuel Cell Component Costs, Energy and Environmental Science Article featured in Chemistry World, Jul. 3, 2014, 3 Pages. https://www.chemistryworld.com/news/3d-printing-cuts-fuel-cell-component-costs/7526.article.

Code of Federal Regulations, National Archives, Title 14, Chapter I, Subchapter C, Part 33, §33.75 Safety Analysis, 2007, refer to p. 25 of 50. https://www.ecfr.gov/cgi-bin/text-idx?SID=5e1a000b517423bb51a8f713ca211b68&mc=true&node=pt14.1.33&rgn=div5#se 14.1.33_175.

Honegger, Gas Turbine Combustion Modeling for a Parametric

(56) References Cited

OTHER PUBLICATIONS

Emissions Monitoring System, Thesis Kansas State University College of Engineering, Manhattan Kansas, 2004, 97 Pages. https://core.ac.uk/download/pdf/5164453.pdf.

Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.1002/wene.246.

Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.

Thorud, Dynamic Modelling and Characterisation of a Solid Oxide Fuel Cell Integrated in a Gas Turbine Cycle, Trondheim, NTNU, Oct. 2005, 278 Pages.

Turbine Engine Relighting in Flight, Certification Memorandum, CM-PIFS-010, European Aviation Safety Agency (EASA), Issue 1, Apr. 29, 2015, 6 Pages.

Whyatt et al., Electrical Generation for More-Electric Aircraft Using Solid Oxide Fuel Cells, No. PNNL-1382, Pacific Northwest National Lab (PNNL), Richland WA, 2012, 110 Pages. https:www.energy.gov/sites/prod/files/2014/03mf9/sofc_for_aircraft_pnnl_2012.pdf.

* cited by examiner

GAS TURBINE ENGINE WITH FUEL CELL ASSEMBLY

FIELD

The present disclosure relates to a gas turbine engine having a fuel cell assembly and a method of operating the same.

BACKGROUND

A gas turbine engine generally includes a turbomachine and a rotor assembly. Gas turbine engines, such as turbofan engines, may be used for aircraft propulsion. In the case of a turbofan engine, the turbomachine includes a compressor section, a combustion section, and a turbine section in serial flow order, and the rotor assembly is configured as a fan assembly.

During operation, air is compressed in the compressor and mixed with fuel and ignited in the combustion section for generating combustion gases which flow downstream through the turbine section. The turbine section extracts energy therefrom for rotating the compressor section and fan assembly to power the gas turbine engine and propel an aircraft incorporating such a gas turbine engine in flight.

At least certain gas turbine engines include a fuel cell assembly operable therewith. The inventors of the present disclosure have found that the fuel cell assembly may be utilized for a variety of purposes in addition to generating electrical power for the gas turbine engine, an aircraft incorporating the gas turbine engine, or both.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
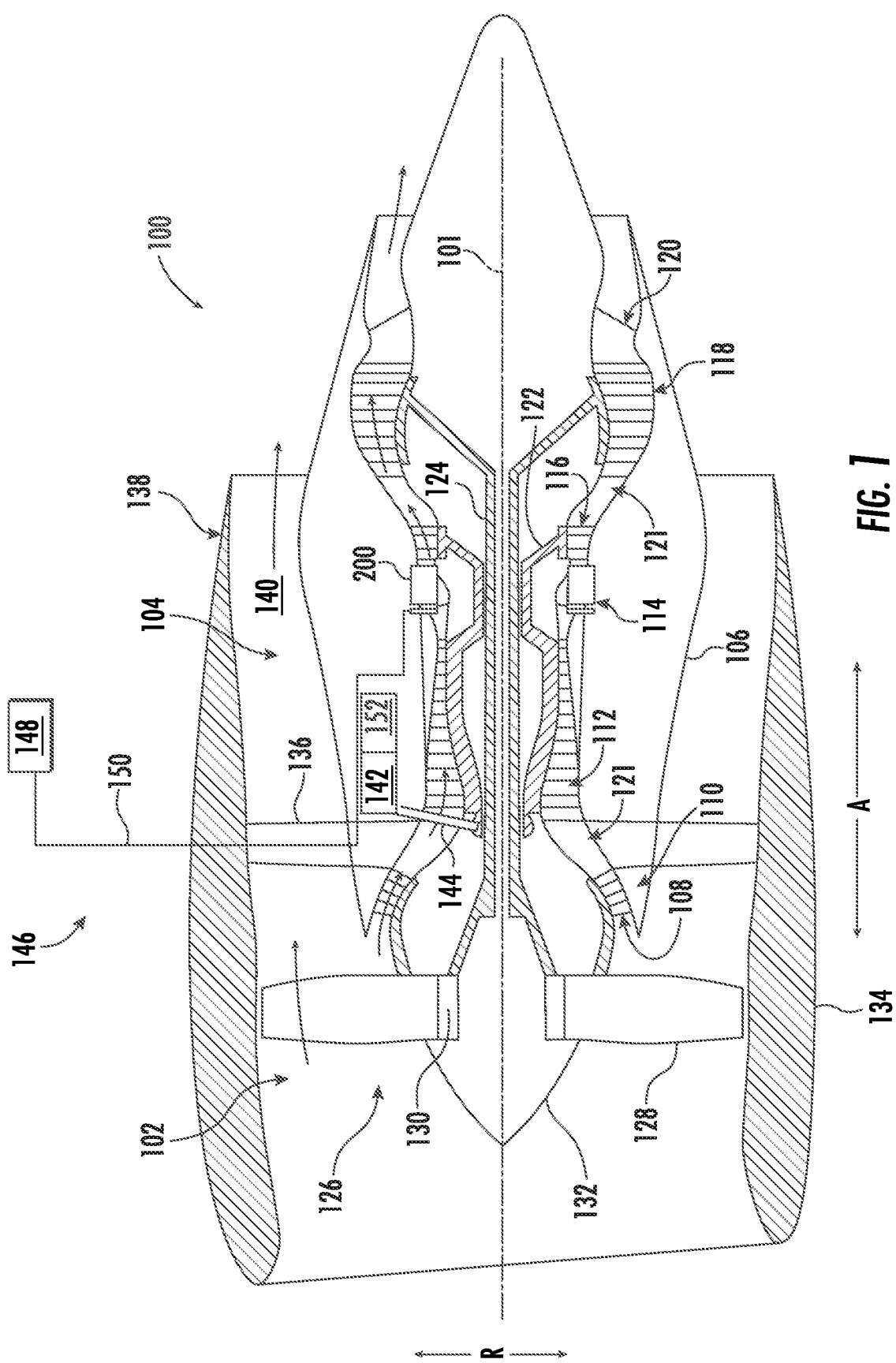
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "vertical", "horizontal", "top", "bottom", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

As will be discussed in more detail below, fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems may advantageously be utilized as an energy supply system because fuel cell systems may be considered environmentally superior and highly efficient when compared to at least certain existing systems. To improve system efficiency and fuel utilization and reduce external water usage, the fuel cell system may include an anode recirculation loop. As a single fuel cell can only generate about 1V voltage, a plurality of fuel cells may be stacked together (which may be referred to as a fuel cell stack) to generate a desired voltage. Fuel cells may include Solid Oxide Fuel Cells (SOFC), Molten Carbonate Fuel Cells (MCFC), Phosphoric Acid Fuel Cells (PAFC), and Proton Exchange Membrane Fuel Cells (PEMFC), all generally named after their respective electrolytes. Each of these fuel cells may have specific benefits in the form of a preferred operating temperature range, power generation capability, efficiency, etc.

In one or more exemplary aspects of the present disclosure, a method is provided for operating a gas turbine engine to reduce or prevent a resonant response of a rotating component using at least in part a secondary fuel source, such as a fuel cell assembly. The method generally includes providing a flow of a primary fuel to a combustor of a turbomachine of the gas turbine engine. The primary flow of fuel may be an aviation fuel provided to the combustor of the turbomachine. The turbomachine includes a compressor, a turbine, and a spool rotatable with the compressor and the turbine. The method further includes receiving data indicative of a spool parameter of the spool, and modifying a flow of a secondary fuel to the combustor in response to the received data indicative of the spool parameter of the spool.

In certain exemplary aspects, the spool parameter may be, e.g., a spool speed or a spool vibration, and the data received may indicate the spool is approaching or entering an engine resonance speed zone, where the spool is susceptible to generating an undesired resonant response while in the engine resonance speed zone. The engine resonance speed zone may be a predefined speed range, or may be a vibration threshold based on real time vibratory response of the spool. If the spool is accelerating, modifying the flow of secondary fuel may include increasing the amount of secondary fuel relative to a scheduled flowrate to assist the turbomachine with accelerating the spool through the engine resonance speed zone more quickly than scheduled to reduce or prevent the undesired resonant response. By contrast, if the spool is decelerating, modifying the flow of secondary fuel may include decreasing the amount of secondary fuel relative to the scheduled flowrate to assist the turbomachine with decelerating the spool through the engine resonance speed zone more quickly than scheduled to reduce or prevent the undesired resonant response.

In another exemplary aspect of the present disclosure, a gas turbine engine is provided. The gas turbine engine includes a turbomachine having a compressor, a combustor, and a turbine arranged in serial flow order, as well as a spool rotatable with the compressor and the turbine. The gas turbine engine further includes an engine dampening system. The engine dampening system includes a fuel cell assembly integrated into the turbomachine; an electric machine drivingly coupled to the spool and electrically coupled to the fuel cell assembly for receiving electrical power from the fuel cell assembly; and a controller operable with the fuel cell assembly, the electric machine, or both. The controller is configured to modify a power provided from the electric machine to the spool for dampening a resonant response of the spool during operation of the gas turbine engine.

For example, during operation, the controller may be configured to increase a power provided to the electric machine from the fuel cell assembly, from a third electric power source, or both to therefore increase a power provided from the electric machine to the spool to dampen a resonant response of the spool. Additionally, or alternatively, the controller may be configured decrease the power extracted from the fuel cell assembly and provided to the electric machine, decrease an amount of power provided from the third electric power source to the electric machine, or increase an amount of power extraction from the electric machine to therefore reduce an amount of power provided from the electric machine to the spool (or increase an amount of power extracted from the spool with the electric machine) to dampen a resonant response of the spool.

Operating the fuel cell assembly, electric machine, or both in accordance with one or more of these exemplary aspects may allow for the gas turbine engine to reduce or avoid an undesired resonant response utilizing equipment installed in the gas turbine engine for other purposes, reducing the need for a dedicated engine dampening system.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass turbofan engine 100. As shown in FIG. 1, the turbofan engine 100 defines an axial direction A (extending parallel to a centerline axis 101 provided for reference), a radial direction R, and a circumferential direction (extending about the axial direction A; not depicted in FIG. 1). In general, the turbofan engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet nozzle exhaust section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The plurality of fan blades 128 and disk 130 are together rotatable about the centerline axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The outer nacelle 134 is supported relative to the turbomachine 104 by a plurality of circumferentially-spaced outlet guide vanes 136. A downstream section 138 of the outer nacelle 134 extends over an outer portion of the turbomachine 104 so as to define a bypass airflow passage 140 therebetween.

In such a manner, it will be appreciated that turbofan engine 100 generally includes a first stream (e.g., core air flowpath 121) and a second stream (e.g., bypass airflow passage 140) extending parallel to the first stream. In certain exemplary embodiments, the turbofan engine 100 may further define a third stream extending, e.g., from the LP compressor 110 to the bypass airflow passage 140 or to ambient. With such a configuration, the LP compressor 110 may generally include a first compressor stage configured as a ducted mid-fan and downstream compressor stages. An inlet to the third stream may be positioned between the first compressor stage and the downstream compressor stages.

Referring still to FIG. 1, the turbofan engine 100 additionally includes an accessory gearbox 142 and a fuel delivery system 146. The fuel delivery system 146 may be an aircraft fuel supply, such as an aircraft fuel supply for a propulsion system for an aircraft. For the embodiment shown, the accessory gearbox 142 is located within the cowling/outer casing 106 of the turbomachine 104. Additionally, it will be appreciated that for the embodiment depicted schematically in FIG. 1, the accessory gearbox 142 is mechanically coupled to, and rotatable with, one or more shafts or spools of the turbomachine 104. For example, in the exemplary embodiment depicted, the accessory gearbox 142 is mechanically coupled to, and rotatable with, the HP shaft 122 through a suitable geartrain 144. The accessory gearbox 142 may provide power to one or more suitable accessory systems of the turbofan engine 100 during at least certain operations, and may further provide power back to the turbofan engine 100 during other operations. For example, the accessory gearbox 142 is, for the embodiment depicted, coupled to a starter motor/generator 152. The starter motor/generator may be configured to extract power from the accessory gearbox 142 and turbofan engine 100 during certain operation to generate electrical power, and may provide power back to the accessory gearbox 142 and turbofan engine 100 (e.g., to the HP shaft 122) during other operations to add mechanical work back to the turbofan engine 100 (e.g., for starting the turbofan engine 100).

Moreover, the fuel delivery system 146 generally includes a fuel source 148, such as a fuel tank, and one or more fuel delivery lines 150. The one or more fuel delivery lines 150 provide a fuel flow through the fuel delivery system 146 to the combustion section 114 of the turbomachine 104 of the turbofan engine 100. As will be discussed in more detail below, the combustion section 114 includes an integrated fuel cell and combustor assembly 200. The one or more fuel delivery lines 150, for the embodiment depicted, provide a flow of fuel to the integrated fuel cell and combustor assembly 200.

It will be appreciated, however, that the exemplary turbofan engine 100 depicted in FIG. 1 is provided by way of example only. In other exemplary embodiments, any other suitable gas turbine engine may be utilized with aspects of the present disclosure. For example, in other embodiments, the turbofan engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Moreover, although the exemplary turbofan engine 100 includes a ducted fan 126, in other exemplary aspects, the turbofan engine 100 may include an unducted fan 126 (or open rotor fan), without the outer nacelle 134. Further, although not depicted herein, in other embodiments the gas turbine engine may be any other suitable type of gas turbine engine, such as a nautical gas turbine engine.

Figure 2:
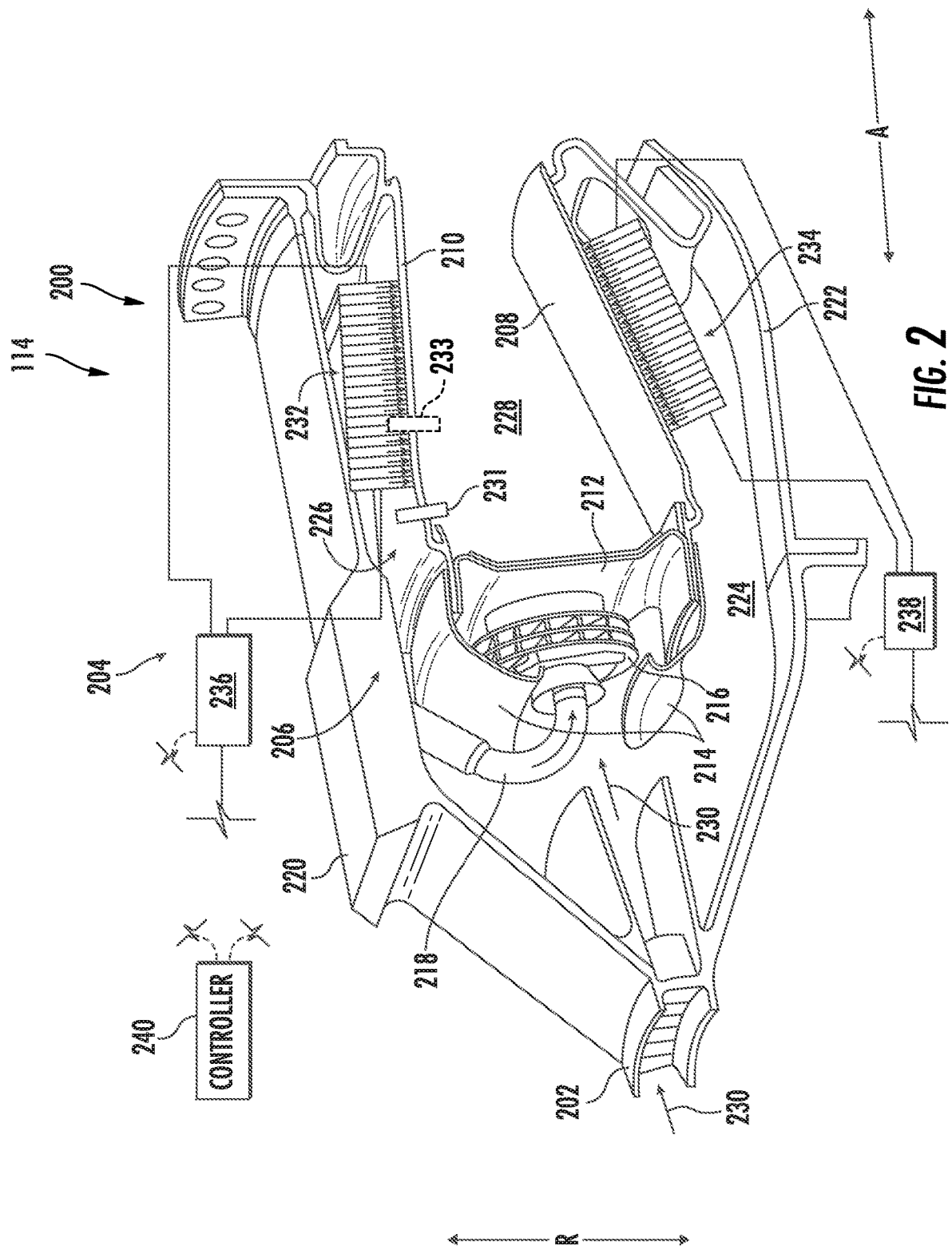
FIG. 2 is a perspective view of an integrated fuel cell and combustor assembly in accordance with the present disclosure.

Referring now to FIG. 2, illustrated schematically is a portion of the combustion section 114 including a portion of the integrated fuel cell and combustor assembly 200 used in the gas turbine engine 100 of FIG. 1 (described as a turbofan engine 100 above with respect to FIG. 1), according to an embodiment of the present disclosure.

As will be appreciated, the combustion section 114 includes a compressor diffuser nozzle 202 and extends between an upstream end and a downstream end generally along the axial direction A. The combustion section 114 is fluidly coupled to the compressor section at the upstream end via the compressor diffuser nozzle 202 and to the turbine section at the downstream end.

The integrated fuel cell and combustor assembly 200 generally includes a fuel cell assembly 204 (only partially depicted in FIG. 2; see also FIGS. 3 through 5) and a combustor 206. The combustor 206 includes an inner liner 208, an outer liner 210, a dome assembly 212, a cowl assembly 214, a swirler assembly 216, and a fuel flowline 218. The combustion section 114 generally includes an outer casing 220 outward of the combustor 206 along the radial direction R to enclose the combustor 206 and an inner casing 222 inward of the combustor 206 along the radial direction R. The inner casing 222 and inner liner 208 define an inner passageway 224 therebetween, and the outer casing 220 and outer liner 210 define an outer passageway 226 therebetween. The inner casing 222, the outer casing 220, and the dome assembly 212 together define at least in part a combustion chamber 228 of the combustor 206.

The dome assembly 212 is disposed proximate the upstream end of the combustion section 114 (i.e., closer to the upstream end than the downstream end) and includes an opening (not labeled) for receiving and holding the swirler assembly 216. The swirler assembly 216 also includes an opening for receiving and holding the fuel flowline 218. The fuel flowline 218 is further coupled to the fuel source 148 (see FIG. 1) disposed outside the outer casing 220 along the radial direction R and configured to receive the fuel from the fuel source 148. In such a manner, the fuel flowline 218 may be fluidly coupled to the one or more fuel delivery lines 150 described above with reference to FIG. 1.

The swirler assembly 216 can include a plurality of swirlers (not shown) configured to swirl the compressed fluid before injecting it into the combustion chamber 228 to generate combustion gas. The cowl assembly 214, in the embodiment depicted, is configured to hold the inner liner 208, the outer liner 210, the swirler assembly 216, and the dome assembly 212 together.

During operation, the compressor diffuser nozzle 202 is configured to direct a compressed fluid 230 from the compressor section to the combustor 206, where the compressed fluid 230 is configured to be mixed with fuel within the swirler assembly 216 and combusted within the combustion chamber 228 to generate combustion gases. The combustion gases are provided to the turbine section to drive one or more turbines of the turbine section (e.g., the high pressure turbine 116 and low pressure turbine 118).

During operation of the gas turbine engine 100 including the integrated fuel cell and combustor assembly 200, a flame within the combustion chamber 228 is maintained by a continuous flow of fuel and air. In order to provide for an ignition of the fuel and air, e.g., during a startup of the gas turbine engine 100, the integrated fuel cell and combustor assembly 200 further includes an ignitor 231. The ignitor 231 may provide a spark or initial flame to ignite a fuel and air mixture within the combustion chamber 228. In certain exemplary embodiments, the integrated fuel cell and combustor assembly 200 may additionally include a dedicated fuel cell ignitor 233 (depicted in phantom). In particular, for the embodiment of FIG. 2, the dedicated fuel cell ignitor 233 is positioned downstream of at least a portion of a fuel cell, and in particular of a fuel cell stack (described below). In such a manner, the dedicated fuel cell ignitor 233 may more effectively combust output products of the fuel cell.

As mentioned above and depicted schematically in FIG. 2, the integrated fuel cell and combustor assembly 200 further includes the fuel cell assembly 204. The exemplary fuel cell assembly 204 depicted includes a first fuel cell stack 232 and a second fuel cell stack 234. More specifically, the first fuel cell stack 232 is configured with the outer liner 210 and the second fuel cell stack 234 is configured with the inner liner 208. More specifically, still, the first fuel cell stack 232 is integrated with the outer liner 210 and the second fuel cell stack 234 is integrated with the inner liner 208. Operation of the fuel cell assembly 204, and more specifically of a fuel cell stack (e.g., first fuel cell stack 232 or second fuel cell stack 234) of the fuel cell assembly 204 will be described in more detail below.

For the embodiment depicted, the fuel cell assembly 204 is configured as a solid oxide fuel cell ("SOFC") assembly, with the first fuel cell stack 232 configured as a first SOFC fuel cell stack and the second fuel cell stack 234 configured as a second SOFC fuel cell stack (each having a plurality of SOFC's). As will be appreciated, a SOFC is generally an electrochemical conversion device that produces electricity directly from oxidizing a fuel. In generally, fuel cell assemblies, and in particular fuel cells, are characterized by an electrolyte material utilized. The SOFC's of the present disclosure may generally include a solid oxide or ceramic electrolyte. This class of fuel cells generally exhibit high combined heat and power efficiency, long-term stability, fuel flexibility, and low emissions.

Moreover, the exemplary fuel cell assembly 204 further includes a first power converter 236 and a second power converter 238. The first fuel cell stack 232 is in electrical communication with the first power converter 236 by a first plurality of power supply cables (not labeled), and the second fuel cell stack 234 is in electrical communication with the second power converter 238 by a second plurality of power supply cables (not labeled).

The first power converter 236 controls the electrical current drawn from the corresponding first fuel cell stack 232 and may convert the electrical power from a direct current ("DC") power to either DC power at another voltage level or alternating current ("AC") power. Similarly, the second power converter 238 controls the electrical current drawn from the second fuel cell stack 234 and may convert the electrical power from a DC power to either DC power at another voltage level or AC power. The first power converter 236, the second power converter 238, or both may be electrically coupled to an electric bus (such as the electric bus 326 described below).

The integrated fuel cell and combustor assembly 200 further includes a fuel cell controller 240 that is in operable communication with both of the first power converter 236 and second power converter 238 to, e.g., send and receive communications and signals therebetween. For example, the fuel cell controller 240 may send current or power setpoint signals to the first power converter 236 and second power converter 238, and may receive, e.g., a voltage or current feedback signal from the first power converter 236 and second power converter 238. The fuel cell controller 240 may be configured in the same manner as the fuel cell controller 240 described below with reference to FIG. 5.

Figure 3:
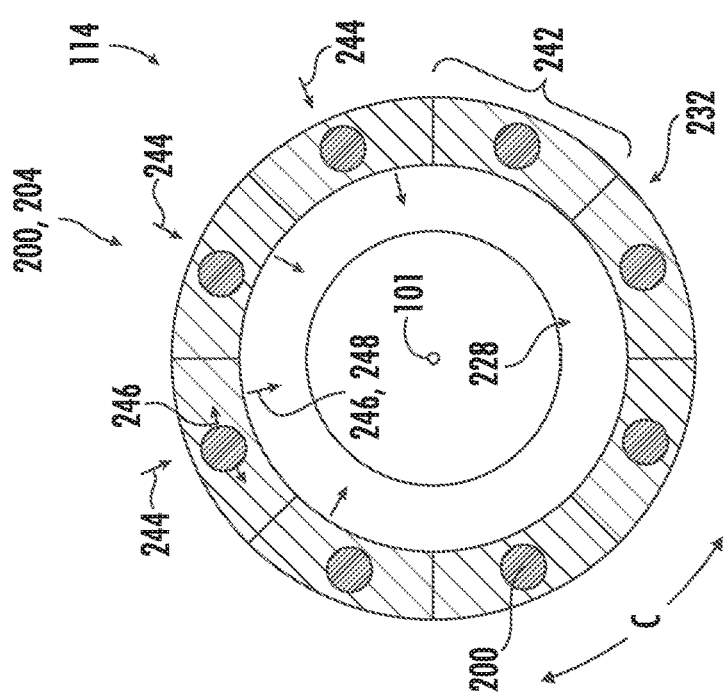
FIG. 3 is a schematic, axial view of the exemplary integrated fuel cell and combustor assembly of FIG. 2.

It will be appreciated that in at least certain exemplary embodiments the first fuel cell stack 232, the second fuel cell stack 234, or both may extend substantially 360 degrees in a circumferential direction C of the gas turbine engine (i.e., a direction extending about the centerline axis 101 of the gas turbine engine 100). For example, referring now to FIG. 3, a simplified cross-sectional view of the integrated fuel cell and combustor assembly 200 is depicted according to an exemplary embodiment of the present disclosure. Although only the first fuel cell stack 232 is depicted in FIG. 3 for simplicity, the second fuel cell stack 234 may be configured in a similar manner.

As shown, the first fuel cell stack 232 extends around the combustion chamber 228 in the circumferential direction C, completely encircling the combustion chamber 228 around the centerline axis 101 in the embodiment shown. More specifically, the first fuel cell stack 232 includes a plurality of fuel cells 242 arranged along the circumferential direction C. The fuel cells 242 that are visible in FIG. 3 can be a single ring of fuel cells 242, with fuel cells 242 stacked together along the axial direction A (see FIG. 2) to form the first fuel cell stack 232. In another instance, multiple additional rings of fuel cells 242 can be placed on top of each other to form the first fuel cell stack 232 that is elongated along the centerline axis 101.

As will be explained in more detail, below, with reference to FIG. 5, the fuel cells 242 in the first fuel cell stack 232 are positioned to receive discharged air 244 from, e.g., the compressor section and fuel 246 from the fuel delivery system 146. The fuel cells 242 generate electrical current using this air 244 and at least some of this fuel 246, and radially direct partially oxidized fuel 246 and unused portion of air 248 into the combustion chamber 228 toward the centerline axis 101. The integrated fuel cell and combustor assembly 200 combusts the partially oxidized fuel 246 and air 248 in the combustion chamber 228 into combustion gases that are directed downstream into the turbine section to drive or assist with driving the one or more turbines therein.

Figure 4:
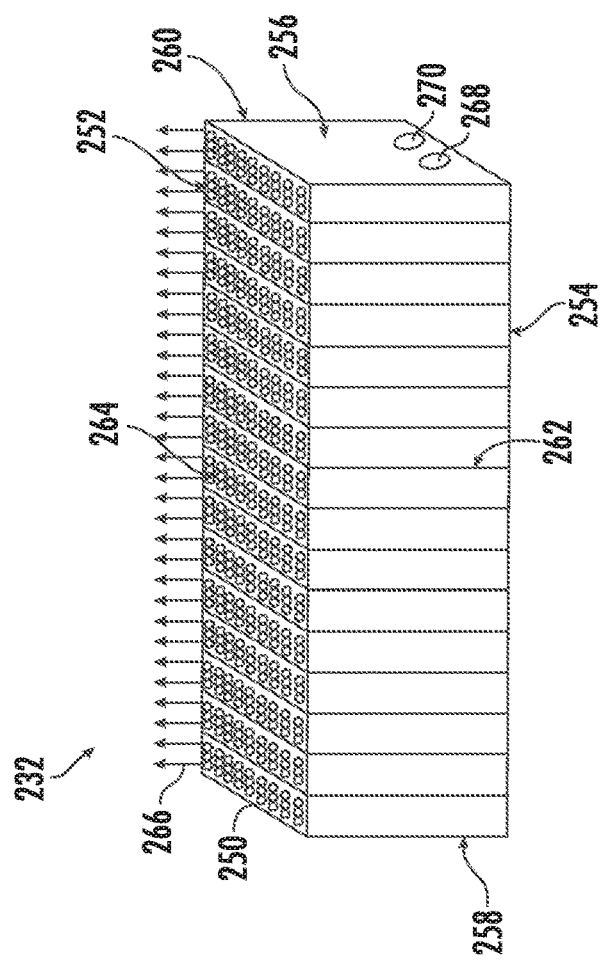
FIG. 4 is a schematic view of a fuel cell of a fuel cell assembly in accordance with an exemplary aspect of the present disclosure as may be incorporated into the exemplary integrated fuel cell and combustor assembly of FIG. 2.

Moreover, referring now to FIG. 4, a schematic illustration is provided as a perspective view of the first fuel cell stack 232 of the integrated fuel cell and combustor assembly 200 of FIG. 2. The second fuel cell stack 234 may be formed in a similar manner.

The first fuel cell stack 232 depicted includes a housing 250 having a combustion outlet side 252 and a side 254 that is opposite to the combustion outlet side 252, a fuel and air inlet side 256 and a side 258 that is opposite to the fuel and air inlet side 256, and sides 260, 262. The side 260, the side 258, and the side 254 are not visible in the perspective view of FIG. 4.

As will be appreciated, the first fuel cell stack 232 may include a plurality of fuel cells that are "stacked," e.g., side-by-side from one end of the first fuel cell stack 232 (e.g., fuel and air inlet side 256) to another end of the first fuel cell stack 232 (e.g., side 258). As such, it will further be appreciated that the combustion outlet side 252 includes a plurality of combustion outlets 264, each from a fuel cell of the first fuel cell stack 232. During operation, combustion gas 266 (also referred to herein as "output products") is directed from the combustion outlets 264 out of the housing 250. In such a manner, the outlet of the fuel cells of the fuel cell stack 232 may be in flow communication with the combustor 206. As described herein, the combustion gas 266 is generated using fuel and air that is not consumed by the fuel cells inside the housing 250 of the first fuel cell stack 232. The combustion gas 266 is provided to the combustion chamber 228 and burned during operation to generate combustion gases used to generate thrust for the gas turbine engine 100 (and vehicle/aircraft incorporating the gas turbine engine 100).

The fuel and air inlet side 256 includes one or more fuel inlets 268 and one or more air inlets 270. Optionally, one or more of the inlets 268, 270 can be on another side of the housing 250. Each of the one or more fuel inlets 268 is fluidly coupled with a source of fuel for the first fuel cell stack 232, such as one or more pressurized containers of a hydrogen-containing gas or a fuel processing unit as described further below. Each of the one or more air inlets 270 is fluidly coupled with a source of air for the fuel cells, such as air that is discharged from a compressor section and/or an air processing unit as is also described further below. The one or more inlets 268, 270 separately receive the fuel and air from the external sources of fuel and air, and separately direct the fuel and air into the fuel cells.

In certain exemplary embodiments, the first fuel cell stack 232 of FIGS. 2 through 4 may be configured in a similar manner to one or more of the exemplary fuel cell systems (labeled 100) described in, e.g., U.S. Patent Application Publication No. 2020/0194799 A1, filed Dec. 17, 2018, that is incorporated by reference herein in its entirety. It will further be appreciated that the second fuel cell stack 234 of FIG. 2, may be configured in a similar manner as the first fuel cell stack 232, or alternatively may be configured in any other suitable manner.

Figure 5:
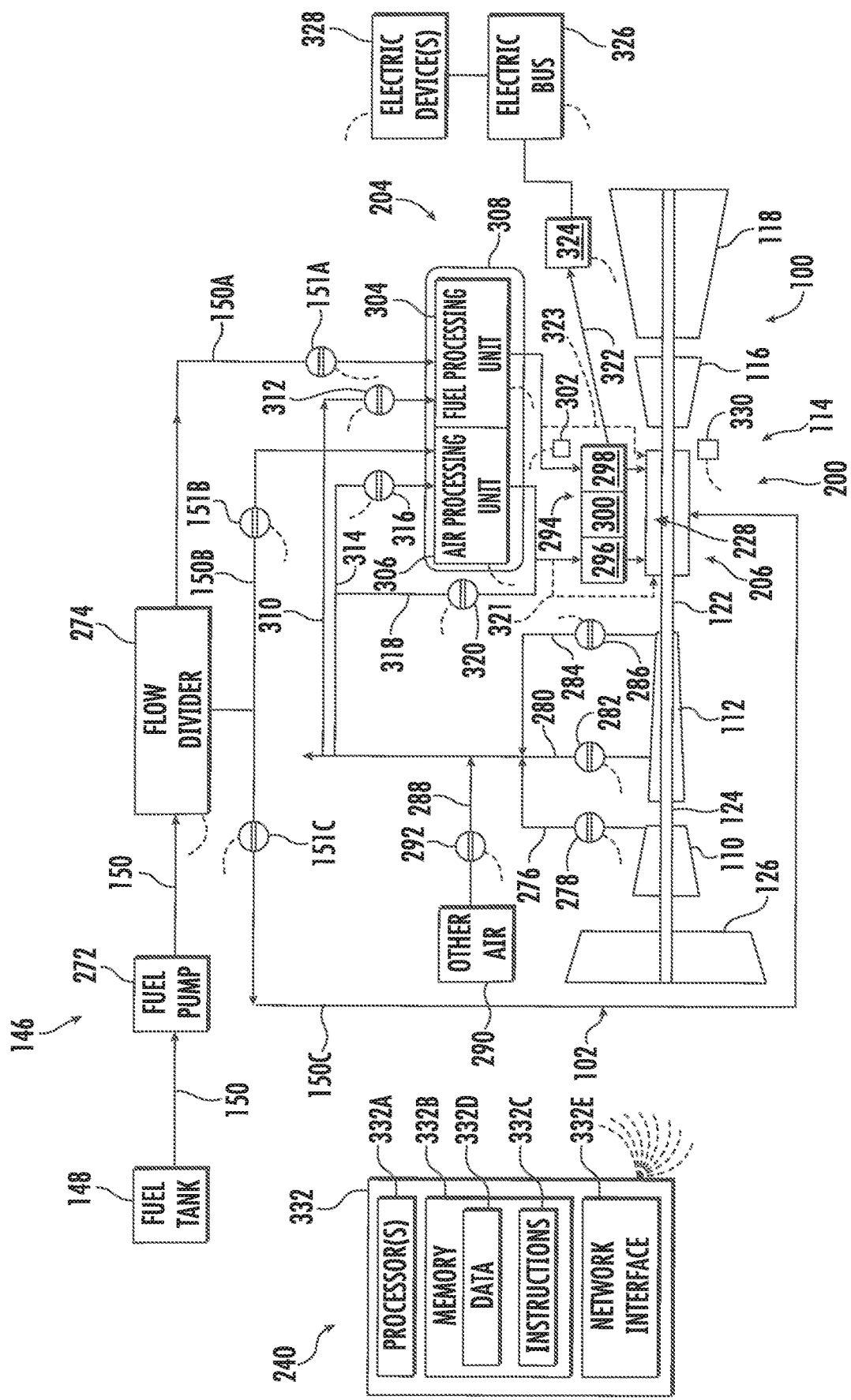
FIG. 5 is a schematic diagram of a gas turbine engine including an integrated fuel cell and combustor assembly in accordance with an exemplary aspect of the present disclosure.

Referring now to FIG. 5, operation of an integrated fuel cell and combustor assembly 200 in accordance with an exemplary embodiment of the present disclosure will be described. More specifically, FIG. 5 provides a schematic illustration of a gas turbine engine 100 and an integrated fuel cell and combustor assembly 200 according to an embodiment of the present disclosure. The gas turbine engine 100 and integrated fuel cell and combustor assembly 200 may, in certain exemplary embodiments, be configured in a similar manner as one or more of the exemplary embodiments of FIGS. 1 through 4.

Accordingly, it will be appreciated that the gas turbine engine 100 generally includes a fan section 102 having a fan 126, an LP compressor 110, an HP compressor 112, a combustion section 114, an HP turbine 116, and an LP turbine 118. The combustion section 114 generally includes the integrated fuel cell and combustor assembly 200 having a combustor 206 and a fuel cell assembly 204.

A propulsion system including the gas turbine engine 100 further includes a fuel delivery system 146. The fuel delivery system 146 generally includes a fuel source 148 and one or more fuel delivery lines 150. The fuel source 148 may include a supply of fuel (e.g., a hydrocarbon fuel, including, e.g., a carbon-neutral fuel or synthetic hydrocarbons) for the gas turbine engine 100. In addition, it will be appreciated that the fuel delivery system 146 also includes a fuel pump 272 and a flow divider 274, and the one or more fuel delivery lines 150 include a first fuel delivery line 150A, a second fuel delivery line 150B, and a third fuel delivery line 150C. The flow divider 274 divides the fuel flow from the fuel source 148 and fuel pump 272 into a first fuel flow through the first fuel delivery line 150A to the fuel cell assembly 204, a second fuel flow through the second fuel delivery line 150B also to the fuel cell assembly 204 (and in particular to an air processing unit, described below), and a third fuel flow through a third fuel delivery line 150C to the combustor 206. The flow divider 274 may include a series of valves (not shown) to facilitate such dividing of the fuel flow from the fuel source 148, or alternatively may be of a fixed geometry. Additionally, for the embodiment shown, the fuel delivery system 146 includes a first fuel valve 151A associated with the first fuel delivery line 150A (e.g., for controlling the first fuel flow), a second fuel valve 151B associated with the second fuel delivery line 150B (e.g., for controlling the second fuel flow), and a third fuel valve 151C associated with the third fuel delivery line 150C (e.g., for controlling the third fuel flow).

The gas turbine engine 100 further includes a compressor bleed system and an airflow delivery system. More specifically, the compressor bleed system includes an LP bleed air duct 276 and an associated LP bleed air valve 278, an HP bleed air duct 280 and an associated HP bleed air valve 282, an HP exit air duct 284 and an associated HP exit air valve 286.

The gas turbine engine 100 further includes an air stream supply duct 288 (in airflow communication with an airflow supply 290) and an associated air valve 292, which is also in airflow communication with the airflow delivery system for providing compressed airflow to the fuel cell assembly 204 of the integrated fuel cell and combustor assembly 200. The airflow supply may be, e.g., a second gas turbine engine configured to provide a cross-bleed air, an auxiliary power unit (APU) configured to provide a bleed air, a ram air turbine (RAT), an ambient location (e.g., a freestream air), etc. The airflow supply may be complimentary to the compressor bleed system if the compressor air source is inadequate or unavailable.

The compressor bleed system (and air stream supply duct 288) is in airflow communication with airflow delivery system for providing compressed airflow to the fuel cell assembly 204, as will be explained in more detail below.

Referring still to FIG. 5, the fuel cell assembly 204 of the integrated fuel cell and combustor assembly 200 includes a fuel cell stack 294, which may be configured in a similar manner as, e.g., the first fuel cell stack 232 described above. The fuel cell stack 294 is depicted schematically as a single fuel cell having a cathode side 296 (also referred to herein as "cathode 296"), an anode side 298 (also referred to herein as "anode 298"), and an electrolyte 300 (also referred to as an electrolyte layer) positioned therebetween. As will generally be appreciated, the electrolyte 300 may, during operation, conduct negative oxygen ions from the cathode side 296 to the anode side 298 to generate an electric current and electric power.

Briefly, it will be appreciated that the fuel cell assembly 204 further includes a fuel cell sensor 302 configured to sense data indicative of a fuel cell assembly operating parameter, such as a temperature of the fuel cell stack 294 (e.g., of the cathode side 296 or anode side 298 of the fuel cell), a pressure within the fuel cell stack 294 (e.g., of within the cathode side 296 or anode side 298 of the fuel cell), and/or a composition (e.g., a chemical composition) of the output products from the fuel cell assembly 204. In such a manner, it will be appreciated that in certain exemplary embodiments, the fuel cell sensor 302 may be a gas sensor, such as a multi-gas sensor.

The anode side 298 may support electrochemical reactions that generate electricity. A fuel may be oxidized in the anode side 298 with oxygen ions received from the cathode side 296 via diffusion through the electrolyte 300. The reactions may create heat, steam, and electricity in the form of free electrons in the anode side 298, which may be used to supply power to an energy consuming device (such as the one or more additional electric devices 328 described below). The oxygen ions may be created via an oxygen reduction of a cathode oxidant using the electrons returning from the energy consuming device into the cathode side 296.

The cathode side 296 may be coupled to a source of the cathode oxidant, such as oxygen in the atmospheric air. The cathode oxidant is defined as the oxidant that is supplied to the cathode side 296 employed by the fuel cell system in generating electrical power. The cathode side 296 may be permeable to the oxygen ions received from the cathode oxidant.

The electrolyte 300 may be in communication with the anode side 298 and the cathode side 296. The electrolyte 300 may pass the oxygen ions from the cathode side 296 to the anode side 298, and may have little or no electrical conductivity, so as to prevent passage of the free electrons from the cathode side 296 to the anode side 298.

The anode side of a solid oxide fuel cell (such as the anode side 298 of fuel cell stack 294) may be composed of a nickel/yttria-stabilized zirconia (Ni/YSZ) cermet. Nickel in the anode side serves as a catalyst for fuel oxidation and current conductor. During normal operation of the fuel cell stack 294, the operating temperature may be greater than or equal to about 700° C., and the nickel (Ni) in the anode remains in its reduced form due to the continuous supply of primarily hydrogen fuel gas. Alternatively, the anode side may include a small amount of nickel, or may be completely or substantially free of nickel.

The fuel cell stack 294 is disposed downstream of the LP compressor 110, the HP compressor 112, or both. Further, as will be appreciated from the description above with respect to FIG. 2, the fuel cell stack 294 may be coupled to or otherwise integrated with a liner of the combustor 206 (e.g., an inner liner 208 or an outer liner 210). In such a manner, the fuel cell stack 294 may also be arranged upstream of the combustion chamber 228 of the integrated fuel cell and combustor assembly 200, and further upstream of the HP turbine 116 and LP turbine 118.

As shown in FIG. 5, the fuel cell assembly 204 also includes a fuel processing unit 304 and an air processing unit 306. The fuel processing unit 304 may be any suitable structure for generating a hydrogen rich fuel stream. For example, the fuel processing unit 304 may include a fuel reformer or a catalytic partial oxidation convertor (CPOx) for developing the hydrogen rich fuel stream for the fuel cell stack 294. The air processing unit 306 may be any suitable structure for raising the temperature of air that is provided thereto to a temperature high enough to enable fuel cell temperature control (e.g., about 600° C. to about 800° C.). For example, in the embodiment depicted, the air processing unit includes a preburner system, operating based on a fuel flow through the second fuel delivery line 150B, configured for raising the temperature of the air through combustion, e.g., during transient conditions such as startup, shutdown and abnormal situations.

In the exemplary embodiment depicted, the fuel processing unit 304 and air processing unit 306 are manifolded together within a housing 308 to provide conditioned air and fuel to the fuel cell stack 294.

It should be appreciated, however, that the fuel processing unit 304 may additionally or alternatively include any suitable type of fuel reformer, including but not limited to a catalytic partial oxidizer, an autothermal reformer, or a steam reformer that may need an additional stream of steam inlet with higher hydrogen composition at the reformer outlet stream. Additionally, or alternatively, still, the fuel processing unit 304 may include a reformer integrated with the fuel cell stack 294. Similarly, it should be appreciated that the air processing unit 306 of FIG. 5 could alternatively be a heat exchanger or another device for raising the temperature of the air provided thereto to a temperature high enough to enable fuel cell temperature control (e.g., about 600° C. to about 800° C.).

As mentioned above, the compressor bleed system (and air stream supply duct 288) is in airflow communication with airflow delivery system for providing compressed airflow to the fuel cell assembly 204. The airflow delivery system includes an anode airflow duct 310 and an associated anode airflow valve 312 for providing an airflow to the fuel processing unit 304, a cathode airflow duct 314 and associated cathode airflow valve 316 for providing an airflow to the air processing unit 306, and a cathode bypass air duct 318 and an associated cathode bypass air valve 320 for providing an airflow directly to the fuel cell stack 294 (or rather to the cathode side 296 of the fuel cell(s)). The fuel delivery system 146 is configured to provide the first flow of fuel through the first fuel delivery line 150A to the fuel processing unit 304, and the second flow of fuel through the second fuel delivery line 150B to the air processing unit 306 (e.g., as fuel for a preburner system, if provided).

The fuel cell stack 294 outputs the power produced as a fuel cell power output 322. Further, the fuel cell stack 294 directs a cathode air discharge and an anode fuel discharge (neither labeled for clarity purposes) into the combustion chamber 228 of the combustor 206.

In operation, the air processing unit 306 is configured to heat/cool a portion of the compressed air, incoming through the cathode airflow duct 314, to generate a processed air to be directed into the fuel cell stack 294 to facilitate the functioning of the fuel cell stack 294. The air processing unit 306 receives the second flow of fuel from the second fuel delivery line 150B and may, e.g., combust such second flow of fuel to heat the air received to a desired temperature (e.g., about 600° C. to about 800° C.) to facilitate the functioning of the fuel cell stack 294. The air processed by the air processing unit 306 is directed into the fuel cell stack 294. In an embodiment of the disclosure, as is depicted, the cathode bypass air duct 318 and the air processed by the air processing unit 306 may combine into a combined air stream to be fed into a cathode 296 of the fuel cell stack 294.

Further, as shown in the embodiment of FIG. 5, the first flow of fuel through the first fuel delivery line 150A is directed to the fuel processing unit 304 for developing a hydrogen rich fuel stream (e.g., optimizing a hydrogen content of a fuel stream), to also be fed into the fuel cell stack 294. As will be appreciated, and as discussed below, the flow of air (processed air and bypass air) to the fuel cell stack 294 (e.g., the cathode side 296) and fuel from the fuel processing unit 304 to the fuel cell stack 294 (e.g., the anode side 298) may facilitate electrical power generation.

Because the inlet air for the fuel cell stack 294 may come solely from the upstream compressor section without any other separately controlled air source, it will be appreciated that the inlet air for the fuel cell stack 294 discharged from the compressor section is subject to the air temperature changes that occur at different flight stages. By way of illustrative example only, the air within a particular location in the compressor section of the gas turbine engine 100 may work at 200° C. during idle, 600° C. during take-off, 268° C. during cruise, etc. This type of temperature change to the inlet air directed to the fuel cell stack 294 may lead to significant thermal transient issues (or even thermal shock) to the ceramic materials of the fuel cell stack 294, which could range from cracking to failure.

Thus, by fluidly connecting the air processing unit 306 between the compressor section and the fuel cell stack 294, the air processing unit 306 may serve as a control device or system to maintain the air processed by the air processing unit 306 and directed into the fuel cell stack 294 within a desired operating temperature range (e.g., plus or minus 100° C., or preferably plus or minus 50° C., or plus or minus 20° C.). In operation, the temperature of the air that is provided to the fuel cell stack 294 can be controlled (relative to a temperature of the air discharged from the compressor section) by controlling the flow of fuel to the air processing unit 306. By increasing a fuel flow to the air processing unit 306, a temperature of the airflow to the fuel cell stack 294 may be increased. By decreasing the fuel flow to the air processing unit 306, a temperature of the airflow to the fuel cell stack 294 may be decreased. Optionally, no fuel can be delivered to the air processing unit 306 to prevent the air processing unit 306 from increasing and/or decreasing the temperature of the air that is discharged from the compressor section and directed into the air processing unit 306.

Moreover, as is depicted in phantom, the fuel cell assembly 204 further includes an airflow bypass duct 321 extending around the fuel cell to allow a portion or all of an airflow conditioned by the air processing unit 306 (and combined with any bypass air through cathode bypass air duct 318) to bypass the cathode side 296 of the fuel cell and go directly to the combustion chamber 228. The airflow bypass duct 321 may be in thermal communication with the fuel cell. The fuel cell assembly further includes a bypass fuel line 323 extending around the fuel cell to allow a portion or all of a reformed fuel from the fuel processing unit 304 to bypass the anode side 298 of the fuel cell and go directly to the combustion chamber 228.

As briefly mentioned above, the fuel cell stack 294 converts the anode fuel stream from the fuel processing unit 304 and air processed by the air processing unit 306 sent into the fuel cell stack 294 into electrical energy, the fuel cell power output 322, in the form of DC current. This fuel cell power output 322 is directed to a power convertor 324 in order to change the DC current into DC current or AC current that can be effectively utilized by one or more subsystems. In particular, for the embodiment depicted, the electrical power is provided from the power converter to an electric bus 326. The electric bus 326 may be an electric bus dedicated to the gas turbine engine 100, an electric bus of an aircraft incorporating the gas turbine engine 100, or a combination thereof. The electric bus 326 is in electric communication with one or more additional electrical devices 328, which may be a power source, a power sink, or both. For example, the additional electrical devices 328 may be a power storage device (such as one or more batteries), an electric machine (an electric generator, an electric motor, or both), an electric propulsion device, etc. For example, the one or more additional electric devices 328 may include the starter motor/generator of the gas turbine engine 100.

Referring still to FIG. 5, the gas turbine engine 100 further includes a sensor 330. In the embodiment shown, the sensor 330 may be configured to sense data indicative of an operating condition of the gas turbine engine, as described in more detail below. The sensor 330 may be, for example, a speed sensor for sensing data indicative of a rotational speed of one or more components of the gas turbine engine 100. Additionally, or alternatively, the sensor 330 may be any other suitable sensor, or any suitable combination of sensors, configured to sense one or more gas turbine engine operating conditions or parameters, including data indicative of a rotational speed of a component of the gas turbine engine 100.

Moreover, as is further depicted schematically in FIG. 5, the propulsion system, an aircraft including the propulsion system, or both, includes a controller 240. For example, the controller 240 may be a standalone controller, a gas turbine engine controller (e.g., a full authority digital engine control, or FADEC, controller), an aircraft controller, supervisory controller for a propulsion system, a combination thereof, etc.

The controller 240 is operably connected to the various sensors, valves, etc. within at least one of the gas turbine engine 100 and the fuel delivery system 146. More specifically, for the exemplary aspect depicted, the controller 240 is operably connected to the valves of the compressor bleed system (valves 278, 282, 286), the airflow delivery system (valves 312, 316, 320), and the fuel delivery system 146 (flow divider 274, valves 151A, 151B, 151C), as well as a sensor 330 of the gas turbine engine 100 and the fuel cell sensor 302. As will be appreciated from the description below, the controller 240 may be in wired or wireless communication with these components. In this manner, the controller 240 may receive data from a variety of inputs (including the gas turbine engine sensor 330 and the fuel cell sensor 302), may make control decisions, and may provide data (e.g., instructions) to a variety of output (including the valves of the compressor bleed system to control an airflow bleed from the compressor section, the airflow delivery system to direct the airflow bled from the compressor section, and the fuel delivery system 146 to direct the fuel flow within the gas turbine engine 100).

Referring particularly to the operation of the controller 240, in at least certain embodiments, the controller 240 can include one or more computing device(s) 332. The computing device(s) 332 can include one or more processor(s) 332A and one or more memory device(s) 332B. The one or more processor(s) 332A can include any suitable processing device, such as a microprocessor, microcontroller, integrated circuit, logic device, and/or other suitable processing device. The one or more memory device(s) 332B can include one or more computer-readable media, including, but not limited to, non-transitory computer-readable media, RAM, ROM, hard drives, flash drives, and/or other memory devices.

The one or more memory device(s) 332B can store information accessible by the one or more processor(s) 332A, including computer-readable instructions 332C that can be executed by the one or more processor(s) 332A. The instructions 332C can be any set of instructions that when executed by the one or more processor(s) 332A, cause the one or more processor(s) 332A to perform operations. In some embodiments, the instructions 332C can be executed by the one or more processor(s) 332A to cause the one or more processor(s) 332A to perform operations, such as any of the operations and functions for which the controller 240 and/or the computing device(s) 332 are configured, the operations for operating a propulsion system (e.g., method 600), as described herein, and/or any other operations or functions of the one or more computing device(s) 332. The instructions 332C can be software written in any suitable programming language or can be implemented in hardware.

Additionally, and/or alternatively, the instructions 332C can be executed in logically and/or virtually separate threads on processor(s) 332A. The memory device(s) 332B can further store data 332D that can be accessed by the processor(s) 332A. For example, the data 332D can include data indicative of power flows, data indicative of gas turbine engine 100/aircraft operating conditions, and/or any other data and/or information described herein.

The computing device(s) 332 also includes a network interface 332E configured to communicate, for example, with the other components of the gas turbine engine 100 (such as the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302), the aircraft incorporating the gas turbine engine 100, etc. The network interface 332E can include any suitable components for interfacing with one or more network(s), including for example, transmitters, receivers, ports, controllers, antennas, and/or other suitable components. In such a manner, it will be appreciated that the network interface 332E may utilize any suitable combination of wired and wireless communications network(s).

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

It will be appreciated that the gas turbine engine 100, the exemplary fuel delivery system 146, the exemplary integrated fuel cell and combustor assembly 200, and the exemplary fuel cell assembly 204 are provided by way of example only. In other embodiments, the integrated fuel cell and combustor assembly 200 and fuel cell assembly 204 may have any other suitable configuration. For example, in other exemplary embodiments, the fuel cell assembly 204 may include any other suitable fuel processing unit 304. Additionally, or alternatively, the fuel cell assembly 204 may not require a fuel processing unit 304, e.g., when the combustor of the gas turbine engine 100 is configured to burn hydrogen fuel and the fuel delivery system 146 is configured to provide hydrogen fuel to the integrated fuel cell and combustor assembly 200, and in particular to the fuel cell assembly 204.

Referring still to FIG. 5, it will be appreciated that certain gas turbine engines generate a resonant response within the gas turbine engine when operated at certain rotational speeds, which may be caused by, e.g., an airfoil vibratory response, a rotor imbalance, rotor dynamic modes, external component resonant responses, and the like. In order to address such issues, the gas turbine engine 100 of the present disclosure is configured to utilize the fuel cell assembly 204 to provide an effective damping of these resonant responses, to assist with accelerating through the rotational speeds at which the gas turbine engine 100 is susceptible to the resonant responses, to assist with decelerating through the rotational speeds at which gas turbine engine 100 is susceptible to the resonant responses, or a combination thereof.

More specifically, for the embodiment depicted, the gas turbine engine 100 includes an engine resonance monitor configured to sense data indicative of a spool parameter of a spool (used herein interchangeably with the term "shaft") of the gas turbine engine 100 (e.g., HP shaft 122, LP shaft 124, etc.). In at least certain exemplary aspects, the spool parameter may be a rotational speed of the spool, a vibration of the spool, a displacement of the spool, or a combination thereof. In particular, for the embodiment depicted, the engine resonance monitor includes the sensor 330 configured to sense data indicative of the spool parameter (e.g., a speed sensor configured to sense data indicative of a rotational speed of the spool, a vibration sensor configured to sense data indicative of a vibration of the spool, or both).

Further, as will be appreciated from the description hereinabove, the gas turbine engine 100 is configured to provide a primary flow of fuel to the combustor 206 of the turbomachine 104. The primary flow of fuel refers to the flow of fuel through the third fuel delivery line 150C of the fuel delivery system 146. The primary flow of fuel may be a flow of aviation fuel.

Further, still, as will be appreciated from the description hereinabove, the gas turbine engine 100 is configured to provide a flow of a secondary fuel to the combustor 206 of the turbomachine 104. For example, the flow of the secondary fuel may be the output products from the fuel cell of the fuel cell stack 294 of the fuel cell assembly 204, may be a fuel flow directly from the fuel processing unit 304 of the fuel cell assembly 204 (provided through bypass fuel line 323), or may be a combination thereof. In such a manner, it will be appreciated that the secondary fuel may be different than the primary fuel. For example, the secondary fuel may be a hydrogen gas, or may be a gas having a relatively high hydrogen composition. In such a manner, it will be appreciated that the secondary fuel may have a higher specific heat than a specific heat of the primary fuel. Moreover, in such a manner, it will be appreciated that an amount of the secondary fuel provided to the combustor 206 may have a relatively large effect on the amount of energy provided from the combustor 206 to turbine section, and hence on a rotational speed of one or more of the spools of the gas turbine engine 100.

In order to assist with accelerating or decelerating a spool of the gas turbine engine 100 through a rotational speed range at which the gas turbine engine 100 may be susceptible to an undesired resonant response, the gas turbine engine 100 may be configured to modify the flow of the secondary fuel to the combustor 206 in response to data received indicative of the spool parameter of the spool. In particular, the controller 240 may receive the data indicative of the spool parameter of the spool from the engine resonance monitor (and more specifically from the sensor 330 in the embodiment depicted) and may provide instructions to the fuel cell assembly 204 to modify the flow of the secondary fuel to the combustor 206 in response.

In at least certain exemplary aspects, modifying the flow of the secondary fuel to combustor 206 may include increasing or decreasing a bypass ratio of fuel from the fuel processing unit 304 around the fuel cell of the fuel cell stack 294 and through the bypass fuel line 323, may include increasing or decreasing a power extraction of the fuel cell stack 294 (affecting an amount of power generated by the fuel cell assembly 204 and provided to, e.g., the electric bus; and affecting a fuel utilization within the fuel cell stack 294 and thus a gas composition/hydrogen composition of the output products provided from the fuel cell stack 294 to the combustor 206), may include changing a fuel-to-air ratio provided to the fuel cell stack 294, may include changing a temperature of an airflow provided to the fuel cell stack 294, or modifying one or more other components/process parameters of the fuel cell assembly 204 to influence the flow of secondary fuel provided to the combustor 206.

Figure 6:
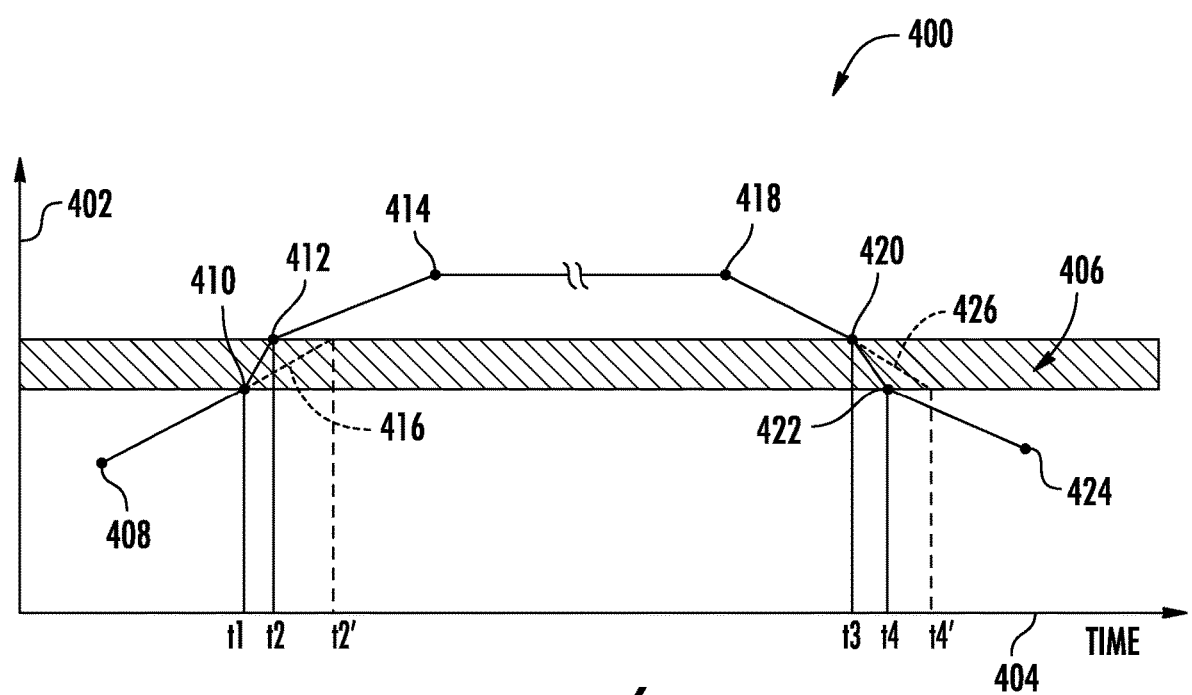
FIG. 6 is a graph depicting a sequence of operations of the exemplary gas turbine engine of FIG. 5 in accordance with an exemplary aspect of the present disclosure.

Referring now to FIG. 6, a graph 400 of a sequence of operations of the gas turbine engine 100 of FIG. 5 in accordance with an exemplary aspect of the present disclosure is depicted. In particular, the graph 400 of FIG. 6 depicts a rotor speed of a rotor of the gas turbine engine 100 along a y-axis 402 and time along an x-axis 404. The rotor may be the LP shaft 124 or the HP shaft 122 of the gas turbine engine 100 described above.

In general, the lines from point 408 to point 414 may represent an ascent of an aircraft incorporating the gas turbine engine 100. The line from point 414 to point 418 may represent a steady state operation of the gas turbine engine 100, such as a cruise operation of the gas turbine engine 100. The lines from point 418 to point 424 may represent a descent of the aircraft incorporating the gas turbine engine 100.

For the exemplary gas turbine engine 100, the gas turbine engine 100 defines an engine resonance speed zone 406, within which the rotor of the gas turbine engine 100 is susceptible to generating an undesired resonant response over time.

As the rotor accelerates from point 408 to point 410, the gas turbine engine 100 may provide the flow of the primary fuel and the flow of the secondary fuel to the combustor 206, e.g., according to a fuel schedule to achieve a desired rotational speed/a rotational speed set point for the gas turbine engine 100 (e.g., the rotational speed achieved at point 414, as described below). As the rotor speed approaches the engine resonance speed zone 406, or enters into the engine resonance speed zone 406, at point 410, the gas turbine engine 100 may modify the flow of the secondary fuel to the combustor 206 in order to accelerate the spool through the engine resonance speed zone 406, as is indicated by the line from point 410 to point 412. Notably, in at least certain exemplary aspects, modifying the flow of the secondary fuel to the combustor 206 may include increasing the flow of the secondary fuel to the combustor 206 (relative to a scheduled fuel flowrate, e.g., set by the fuel schedule to achieve the desired rotational speed/the rotational speed set point for the gas turbine engine 100) to accelerate the spool through the engine resonance speed zone 406. Notably, with such a modification of the flow of the secondary fuel, a slope of the engine speed over time may increase relative to a baseline slope of the engine speed over time, indicated in phantom by line 416 in FIG. 6.

After accelerating through the engine resonance speed zone 406, the gas turbine engine 100 may reduce the flow of the secondary fuel back to, e.g., the fuel schedule to achieve the desired rotational speed/the rotational speed set point for the gas turbine engine 100, as is indicated from the slope of the line from point 412 to point 414.

At point 418, as noted above, the aircraft including the gas turbine engine 100 may begin to descend, and therefore may decelerate, as is indicated from the line from point 418 to point 420. As the rotor decelerates to point 420 and approaches the engine resonance speed zone 406, or enters into the engine resonance speed zone 406, at point 420, the gas turbine engine 100 may again modify the flow of secondary fuel to the combustor 206 in order to decelerate the rotor through the engine resonance speed zone 406. Notably, in at least certain exemplary aspects, modifying the flow of secondary fuel to the combustor 206 may include decreasing the flow of the secondary fuel to the combustor 206 (relative to the scheduled fuel flowrate, e.g., set by the fuel schedule to achieve the desired rotational speed/the rotational speed set point for the gas turbine engine 100) to decelerate the spool through the engine resonance speed zone 406. Notably, with such a modification of the flow of the secondary fuel, a slope of the engine speed over time may decrease relative to a baseline slope of the engine speed over time, indicated in phantom by line 426 in FIG. 6.

After decelerating through the engine resonance speed zone 406, the gas turbine engine 100 may increase the flow of the secondary fuel back to, e.g., the fuel schedule to achieve the desired rotational speed/the rotational speed set point for the gas turbine engine 100, as is indicated from the slope of the line from point 422 to point 424.

It will be appreciated that although the engine resonant speed zone 406 is described with reference to FIG. 6 as being a rotational speed range of the rotor, in other exemplary embodiments, the engine resonance speed zone 406 may additionally or alternatively be based on a vibration of the rotor, such as a real-time feedback of a vibration sensor configured to sense data indicative of a vibration of the rotor.

Further, it will be appreciated that in at least certain exemplary aspects, the rotor may need to be maintained within the engine resonance speed zone 406 for at least a minimum time in order for the undesired resonant feedback of the rotor to develop. For example, referring still to FIG. 6, the phantom line 416 extending from point 410 through the engine resonance speed zone 406, which may indicate a normal acceleration through the engine resonance speed zone 406, may have the rotor operating within the engine resonance speed zone 406 for a time equal to t1 to t2'. By contrast, by modifying the flow of the secondary fuel, as discussed above, the rotor may be positioned within the engine resonance speed time from time equal to t1 to t2. The time t1 to t2' may be greater than or equal to the minimum time for the rotor to develop the undesired resonant feedback, while the time t1 to t2 may be less than the minimum time for the rotor to generate the undesired resonant feedback.

In such a manner, it will be appreciated that the gas turbine engine 100, or rather, the controller 240 of the gas turbine engine 100, may determine the minimum time for the rotor to achieve the undesired resonant response while the rotor is operated within the engine resonance speed zone 406. With such a configuration, modifying the flow of the secondary fuel to the combustor 206 may therefore include modifying the flow of the secondary fuel to the combustor 206 to accelerate or decelerate the rotor through the engine resonance speed zone 406 in an amount of time less than the minimum time.

Figure 7:
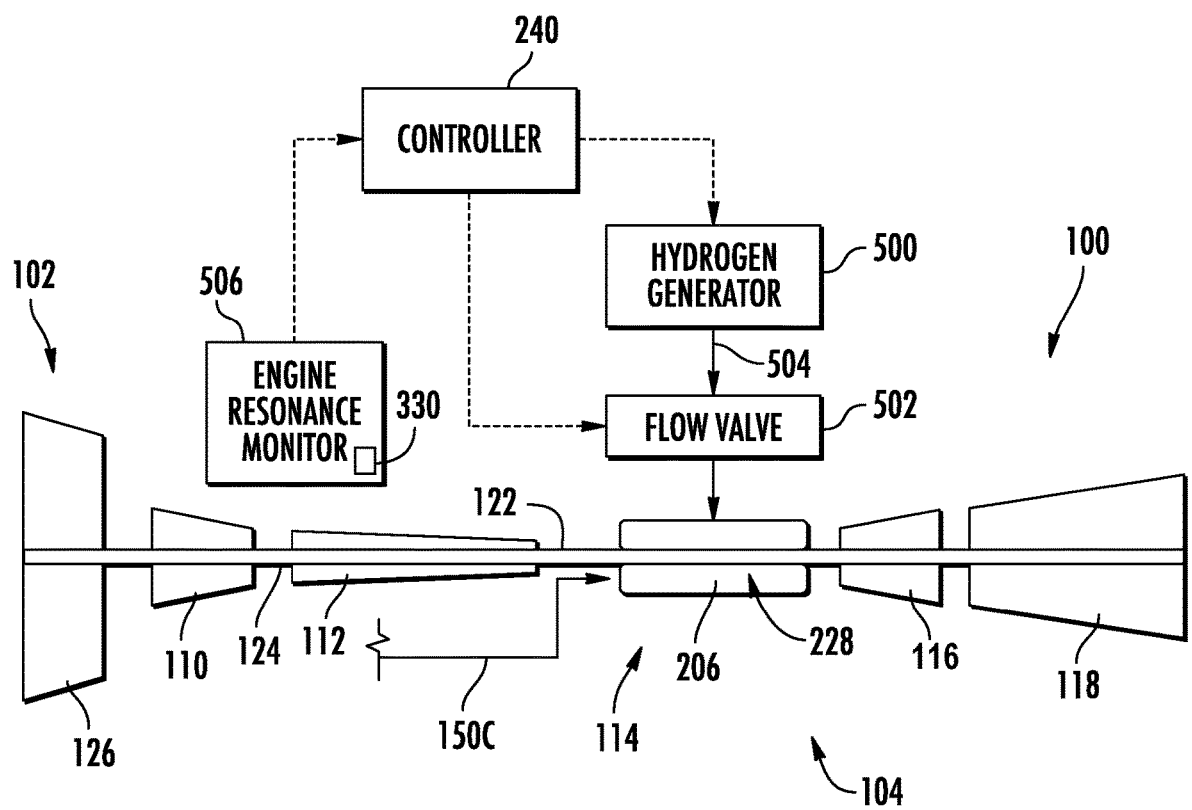
FIG. 7 is a schematic diagram of a gas turbine engine including an integrated fuel cell and combustor assembly in accordance with another exemplary aspect of the present disclosure.

Referring now to FIG. 7, a gas turbine engine 100 in accordance with another example embodiment presents disclosure is provided. The exemplary gas turbine engine 100 of FIG. 7 may be configured in a similar manner as the exemplary gas turbine engine 100 described above, and therefore the same or similar numbers may refer to the same or similar parts.

For example, the exemplary gas turbine engine 100 generally includes a fan section 102 having a fan 126 and a turbomachine 104. The turbomachine 104 generally includes a compressor section, a combustion section 114 having a combustor 206, and a turbine section arranged in serial flow order. The turbomachine 104 further includes a spool. More specifically, the turbomachine 104 includes an HP shaft 122 (also referred to as an HP spool) rotatable with an HP compressor 112 of the compressor section and an HP turbine 116 of the turbine section, as well as an LP shaft 124 (also referred to as an LP spool) rotatable with an LP compressor 110 of the compressor section and an LP turbine 118 of the turbine section. The turbomachine 104 is configured to drive the fan 126.

Further, the gas turbine engine 100 includes a primary fuel source configured to provide a flow of primary fuel to the combustor 206 during operation of the gas turbine engine 100 (e.g., a fuel source 148, see FIG. 5, configured to provide the flow of fuel through third fuel delivery line 150C), as well as a secondary fuel source. However, for the embodiment FIG. 7, the secondary fuel source may not be a fuel cell assembly (such as fuel cell assembly 204). Instead, for the embodiment of FIG. 7, the secondary fuel source may be any other suitable source of secondary fuel. In particular, for the embodiment of FIG. 7, the secondary fuel source may be a hydrogen generator 500. The hydrogen generator 500 may be, e.g., a fuel processing unit (e.g., configured similarly to fuel processing unit 304 of FIG. 5, such as a fuel reformer) configured to receive a flow of aviation fuel and convert such flow of aviation fuel into a flow of hydrogen fuel.

Further, the gas turbine engine 100 includes a flow valve 502 positioned within a fluid flow path 504 between the hydrogen generator 500 and the combustor 206. The flow valve 502 may be configured to regulate the flow of the secondary fuel to the combustor 206, and more specifically, a flow of the hydrogen fuel to the combustor 206 from the hydrogen generator 500 through the fluid flow path 504.

The exemplary gas turbine engine 100, as with the embodiment above, further includes an engine resonance monitor 506 and a controller 240. The engine resonance monitor 506 includes a sensor 330 configured to sense data indicative of a spool parameter.

The controller 240 is operably coupled to the engine resonance monitor 506, the hydrogen generator 500, and the flow valve 502. In such a manner, the controller 240 may be configured to receive data indicative of the spool parameter of a spool of the gas turbine engine 100, and in response, provide control commands to the hydrogen generator 500, the flow valve 502, or both.

In such a manner, the gas turbine engine may be configured to operate in a similar manner as the exemplary gas turbine engine 100 described above with reference to FIGS. 5 and 6 to minimize a resonance response of a spool (or shaft) of the gas turbine engine 100 by modifying the flow of the secondary fuel to the combustor 206 of the gas turbine engine 100.

Figure 8:
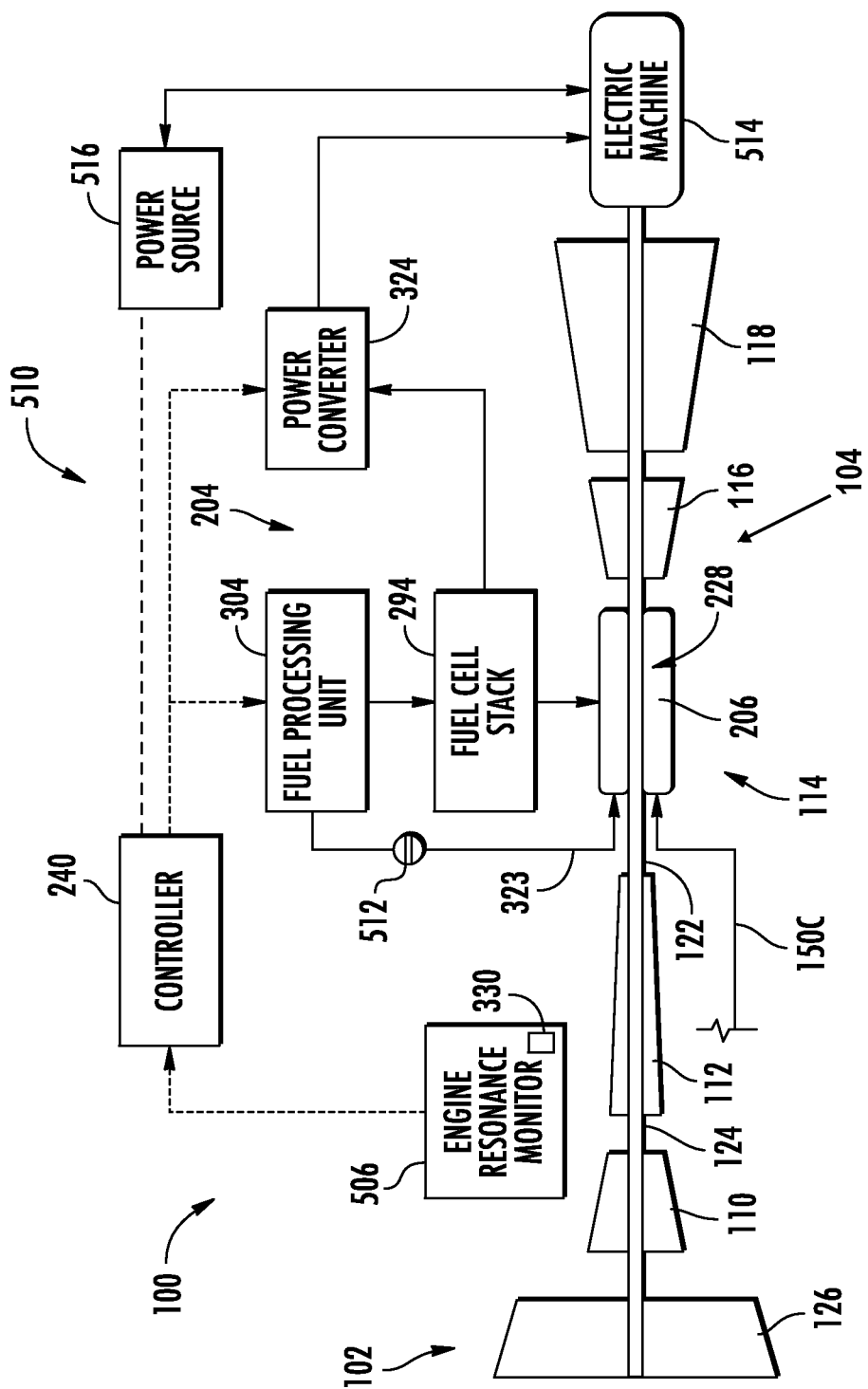
FIG. 8 is a schematic diagram of a gas turbine engine including an integrated fuel cell and combustor assembly in accordance with yet another exemplary aspect of the present disclosure.

Referring now to FIG. 8, a simplified schematic view is provided of a gas turbine engine 100 in accordance with yet another exemplary embodiment of the present disclosure. The exemplary embodiment of FIG. 8 may be configured in a similar manner as the exemplary embodiment described above with reference to FIGS. 1 to 5, and therefore the same or similar numbers may refer to the same or similar parts.

For example, the exemplary gas turbine engine 100 generally includes a fan section 102 having a fan 126 and a turbomachine 104. The turbomachine 104 generally includes a compressor section, a combustion section 114 having a combustor 206, and a turbine section arranged in serial flow order. The turbomachine 104 further includes a spool. More specifically, the turbomachine 104 includes an HP shaft 122 (also referred to as an HP spool) rotatable with an HP compressor 112 of the compressor section and an HP turbine 116 of the turbine section, as well as an LP shaft 124 (also referred to as an LP spool) rotatable with an LP compressor 110 of the compressor section and an LP turbine 118 of the turbine section. The turbomachine 104 is configured to drive the fan 126.

Further, the gas turbine engine 100 includes a primary fuel source configured to provide a flow of primary fuel to the combustor 206 during operation of the gas turbine engine 100 (e.g., a fuel source 148, see FIG. 5, configured to provide the flow of fuel through third fuel delivery line 150C).

In addition, the exemplary gas turbine engine 100 of FIG. 8 includes an engine damping system 510 and a fuel cell assembly 204 integrated into the turbomachine 104. For the embodiment shown, the fuel cell assembly 204 is configured as part of the engine damping system 510. The engine damping system 510 further includes an engine resonance monitor 506 having a sensor 330 and a controller 240 operably coupled to the engine resonance monitor 506 and the fuel cell assembly 204.

For the embodiment shown, the fuel cell assembly 204 generally includes a fuel processing unit 304 and a fuel cell stack 294 configured to receive a hydrogen fuel from the fuel processing unit 304. Further, the fuel cell assembly 204 includes a power converter 324 configured to receive an electrical power output from the fuel cell stack 294. In addition to providing the flow of hydrogen fuel to the fuel cell stack 294, the fuel cell assembly 204 includes a bypass fuel line 323 to allow the fuel processing unit 304 to provide a flow of hydrogen fuel directly to the combustor 206, bypassing the fuel cell stack 294. The exemplary fuel cell assembly 204 depicted includes a flow valve 512 fluidly coupled to the bypass fuel line 323.

Further, for the embodiment depicted the engine damping system 510 of the exemplary gas turbine engine 100 further includes an electric machine 514 drivingly coupled to a spool of the turbomachine 104 and electrically coupled to the fuel cell assembly 204 for receiving electrical power from the fuel cell assembly 204. In particular, for the exemplary embodiment depicted, the electric machine 514 is drivingly coupled to the LP shaft 124 of the turbomachine 104 and electrically coupled to the power converter 324 of the fuel cell assembly 204.

As noted above, the controller 240 is operably coupled to the power converter 324 of the fuel cell assembly 204 and the engine resonance monitor 506. In such a manner, it will be appreciated that the electric machine 514 may be configured to modify a power provided to the spool or a power extracted from the spool in response to data received from, e.g., the engine resonance monitor 506 indicative of a spool parameter of the spool. For example, the gas turbine engine 100 may be configured to modify an amount of electric power provided to the electric machine 514 from the fuel cell assembly 204 in response to the data received indicative of the spool parameter of the spool.

For example, with additional reference back to FIG. 6, in response to receiving data indicative of a speed of the spool approaching the engine resonance speed zone 406 (point 410) while accelerating, or a speed of the spool being within the engine resonance speed zone 406 while accelerating, the gas turbine engine 100 may be configured to increase the amount of power added to the spool with the electric machine 514 in order to accelerate the spool more quickly through the engine resonance speed zone 406. Similarly, in response to receiving data indicative of a speed of the spool approaching the engine resonance speed zone 406 (point 420) while decelerating, or a speed of the spool being within the engine resonance speed zone 406 while decelerating, the gas turbine engine 100 may be configured to increase the amount of power extracted from the spool with the electric machine 514 in order to decelerate the spool more quickly through the engine resonance speed zone 406.

Referring back to FIG. 8, it will further be appreciated that the engine damping system 510 depicted therein may further be configured to provide for damping of a variety of resonant responses of the spool during operation of the gas turbine engine 100. For example, the controller 240 may be configured to modify a power provided from the electric machine 514 to the spool to, e.g., dampen a resonant response of the spool during operation of the gas turbine engine 100. More specifically, the controller 240 may be configured to modify a power output of the fuel cell assembly 204, and more specifically may be configured to modify a power extracted from the fuel cell stack 294 of the fuel cell assembly 204 and provided from the power converter 324 and to the electric machine 514 to, e.g., dampen a resonant response of the spool during operation of the gas turbine engine 100

Notably, for the embodiment depicted, the electric machine 514 is further in electrical communication with a power source 516. The power source 516 may be a power source 516 of the gas turbine engine 100, or may be any other suitable power source 516 (e.g., of an aircraft, of a separate gas turbine engine 100, etc.). The power source 516 may be a power bus, an energy storage unit (e.g., battery), or other suitable power source 516. Further for the embodiment depicted, the controller 240 is operably coupled to the power source 516, and the controller 240 may further be configured to provide electrical power from the power source 516 to the electric machine 514 to, e.g., dampen a resonant response of the spool during operation of the gas turbine engine 100.

In particular, it will be appreciated that by utilizing an electric machine 514, the engine damping system 510 may be capable of providing a quick damping response in response to data indicative of a resonant response of the spool. The damping may be achieved by coordinating a power level of the fuel cell assembly 204 and a speed of the electric machine 514 (e.g., accelerate/decelerate at certain frequencies) of the engine damping system 510. In particular, the electric machine 514 may be capable of operating at relatively high rotational speeds to provide damping of high-frequency resonant responses of the spool, and further may be capable of operating at relatively low rotational speeds to provide damping of low-frequency resonant responses of the spool.

In particular, in at least certain exemplary aspects, the engine damping system 510 of FIG. 8 may be configured to provide damping of a resonant response having a frequency greater than about 7 kilohertz ("kHz") and less than about 14 kHz, such as greater than about 8 kHz such as greater than about 9 kHz such as up to about 13 kHz, such as up to about 12 kHz. As will be appreciated, the electric machine 514 will need to rotate at a rotational speed equal to the frequency to provide such damping. These rotational speeds may be considered relatively high-frequency resonant responses. Damping the high-frequency resonance may offer preventive control or mitigation control to balance out or damp out a mode caused by a blade detachment before triggering an emergency shutdown of the gas turbine engine 100, in response to the indication of a blade off, a blade damage, or a significant blade rub causing an imbalance.

Additionally, or alternatively, in the least certain exemplary aspects, the engine damping system 510 of FIG. 8 may be configured to provide damping of a resonant response having a frequency greater than about 50 Hertz ("Hz") and less than about 1 kHz. Damping the high-frequency resonance may offer preventive control or mitigation control for instabilities caused by ingestion of ice from an ice shed, by a valving control, or both.

In such a manner, it will be appreciated that is used herein, the term "damping" of a resonant response of the spool may refer to accelerating or decelerating the spool outside of a speed range associated with that resonant response.

Incorporation of an engine damping system 510 in accordance with one or more exemplary aspects of the present disclosure may allow for a relatively simple and cost-effective manner of addressing resonant responses of a spool of the gas turbine engine 100, without requiring dedicated engine damping systems. For example, with the exemplary engine damping system 510 described herein, the components may have additional functionalities justifying their inclusion within the gas turbine engine 100. For example, the fuel cell assembly 204 may generally be included to provide electrical power for an aircraft and/or the gas turbine engine 100 during normal operations of the gas turbine engine 100 (e.g., steady-state operations, such as cruise). Additionally for example, the electric machine 514 may be configured to generate electrical power for the aircraft and/or gas turbine engine 100 during normal operations of the gas turbine engine 100, may be configured to assist with driving the gas turbine engine 100 during normal operations of the gas turbine engine 100, etc. However, by operating these components in the manner described herein, the components may further be configured to address various engine damping issues.

Figure 9:
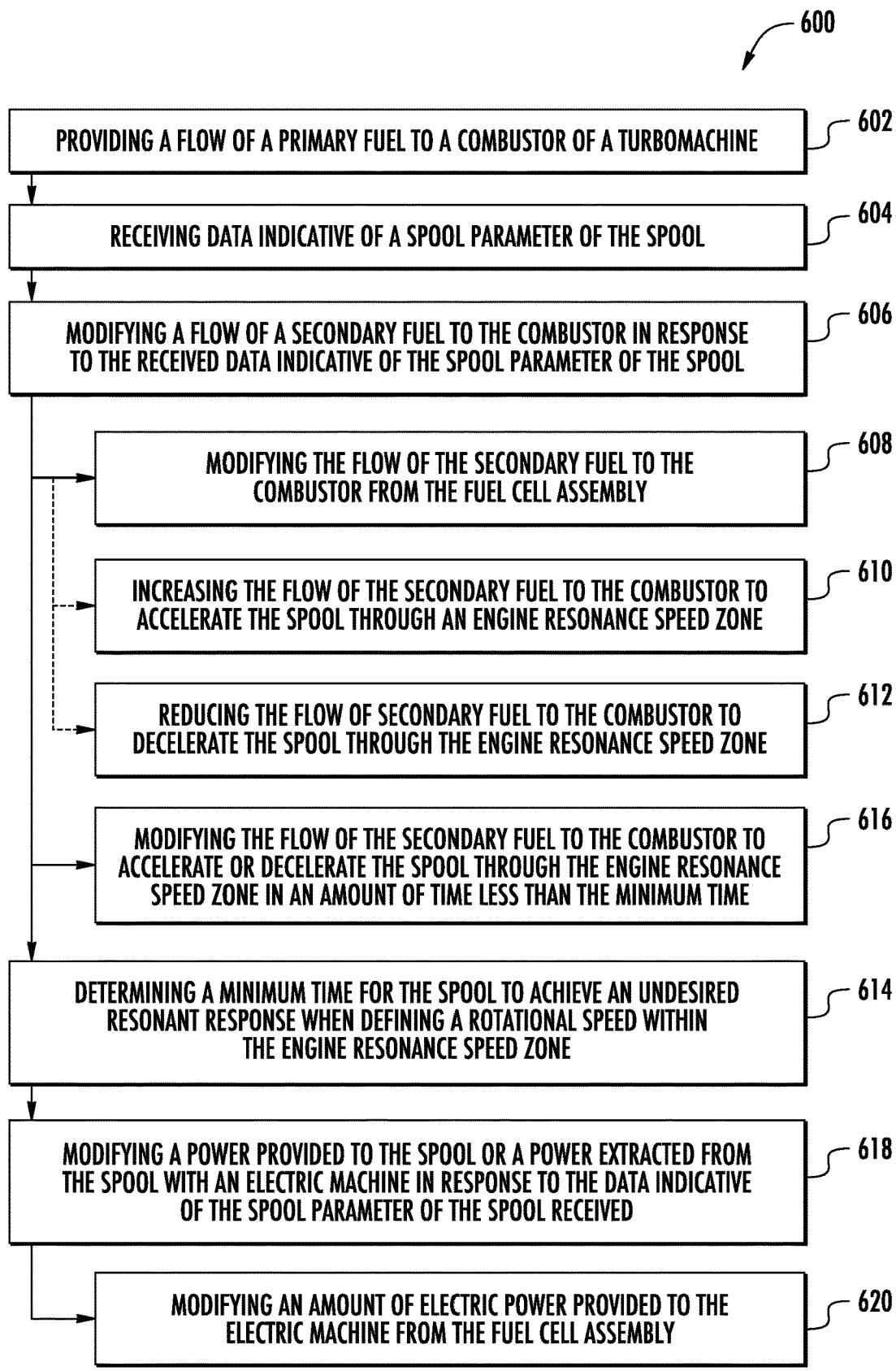
FIG. 9 is a flow diagram of a method for operating a gas turbine engine in accordance with the present disclosure.

Referring now to FIG. 9, a method 600 is provided for operating a gas turbine engine including an engine damping system in accordance with an exemplary aspect of the present disclosure. The example method 600 may be utilized with one or the exemplary embodiment described above with reference FIGS. 1 through 8. Alternatively, the exemplary method 600 may be utilized with any other suitable gas turbine engine having an engine damping system.

The method 600 includes at (602) providing a flow of a primary fuel to a combustor of a turbomachine. The turbomachine may generally include a compressor, a combustor, and a turbine arranged in serial flow order, with a spool rotatable with the compressor and the turbine. The flow of the primary fuel may generally be a flow of aviation fuel to one or more fuel nozzles of the combustor.

The method 600 further includes at (604) receiving data indicative of a spool parameter of the spool. The spool parameter may be a rotational speed of the spool, a vibration of the spool, or both. Additionally, the method 600 includes at (606) modifying a flow of a secondary fuel to the combustor in response to the received data indicative of the spool parameter of the spool at (604).

The engine damping system may include a fuel cell assembly integrated into the turbomachine. With such an exemplary aspect, modifying the flow of the secondary fuel to the combustor at (606) may include at (608) modifying the flow of the secondary fuel to the combustor from the fuel cell assembly.

Generally, modifying the flow of the secondary fuel to the combustor at (606) may have the effect of changing a speed of the spool to be outside of a speed zone where in the spool is susceptible to generating a resonant response. In such a manner, it will be appreciated that modifying the flow of the secondary fuel to the combustor at (606) may include at (610) increasing the flow of the secondary fuel to the combustor to accelerate the spool through an engine resonance speed zone. Conversely, it will be appreciated that modifying the flow of the secondary fuel to the combustor at (606) may include in other exemplary aspects at (612) reducing the flow of secondary fuel to the combustor to decelerate the spool through the engine resonance speed zone.

More particularly, for the exemplary aspect depicted, the method 600 further includes at (614) determining a minimum time for the spool to achieve an undesired resonant response when defining a rotational speed within the engine resonance speed zone. With such an exemplary aspect, modifying the flow of the secondary fuel to the combustor at (606) further includes at (616) modifying the flow of the secondary fuel to the combustor to accelerate or decelerate the spool through the engine resonance speed zone in an amount of time less than the minimum time. In such a manner, the method 600 may prevent the undesired resonant response of the spool.

Referring still to FIG. 9, it will be appreciated that the method 600 further includes at (618) modifying a power provided to the spool or a power extracted from the spool with an electric machine in response to the data indicative of the spool parameter of the spool received at (604). In particular, for the exemplary aspect depicted, modifying the amount of electric power provided to the spool or extracted from the spool with the electric machine at (618) includes at (620) modifying an amount of electric power provided to the electric machine from the fuel cell assembly.

It will be appreciated, however, that in other exemplary aspects, modifying the power provided to the spool or the power extracted from the spool with the electric machine at (618) may include providing power from a separate power source, providing power from the electric machine to a separate power source, or both.

In such a manner, utilizing method 600 may prevent or minimize an undesired resonant response of a spool or other rotational component of the gas turbine engine during operation.

Further aspects are provided by the subject matter of the following clauses:

A method of operating a gas turbine engine, the method comprising: providing a flow of a primary fuel to a combustor of a turbomachine, the turbomachine comprising a compressor, a turbine, and a spool rotatable with the compressor and the turbine; receiving data indicative of a spool parameter of the spool; and modifying a flow of a secondary fuel to the combustor in response to the received data indicative of the spool parameter of the spool.

The method of the preceding clause, wherein the secondary fuel is different than the primary fuel.

The method of any preceding clause, wherein the secondary fuel has a higher specific heat than a specific heat of the primary fuel.

The method of any preceding clause, wherein modifying the flow of the secondary fuel to the combustor comprises modifying the flow of the secondary fuel to the combustor from a fuel cell assembly.

The method of any preceding clause, wherein the fuel cell assembly comprises a fuel processing unit and a fuel cell.

The method of any preceding clause, further comprising: modifying a power provided to the spool or a power extracted from the spool with an electric machine in response to the received data indicative of the spool parameter of the spool.

The method of any preceding clause, wherein modifying the power provided to the spool or a power extracted from the spool with the electric machine comprises modifying an amount of electric power provided to the electric machine from the fuel cell assembly.

The method of any preceding clause, wherein modifying the flow of the secondary fuel to the combustor comprises increasing the flow of the secondary fuel to the combustor to accelerate the spool through an engine resonance speed zone.

The method of any preceding clause, wherein modifying the flow of the secondary fuel to the combustor comprises reducing the flow of the secondary fuel to the combustor to decelerate the spool through an engine resonance speed zone.

The method of any preceding clause, wherein the spool parameter is a rotational speed of the spool, wherein the received data is data indicative of the spool parameter of the spool being within an engine resonance speed zone or of the spool parameter of the spool approaching the engine resonance speed zone.

The method of any preceding clause, further comprising: determining a minimum time for the spool to achieve an undesired resonant response when defining a rotational speed within the engine resonance speed zone, and wherein modifying the flow of the secondary fuel to the combustor comprises modifying the flow of the secondary fuel to the combustor to accelerate or decelerate the spool through the engine resonance speed zone in an amount of time less than the minimum time.

The method of any preceding clause, wherein the spool parameter is a rotational speed of the spool, a vibration of the spool, or both.

A gas turbine engine comprising: a turbomachine having a compressor, a combustor, and a turbine arranged in serial flow order, the turbomachine further comprising a spool rotatable with the compressor and the turbine and a sensor configured to sense data indicative of a spool parameter; a primary fuel line in fluid communication with the combustor for providing a flow of primary fuel to the combustor; a secondary fuel source in fluid communication with the combustor for providing a flow of a secondary fuel to the combustor; and a controller operable with the secondary fuel source for modifying the flow of the secondary fuel to the combustor in response to data indicative of the spool parameter of the spool.

The gas turbine engine of any preceding clause, wherein the secondary fuel source is a fuel cell assembly.

A gas turbine engine comprising: a turbomachine having a compressor, a combustor, and a turbine arranged in serial flow order, the turbomachine further comprising a spool rotatable with the compressor and the turbine; and an engine dampening system comprising a fuel cell assembly integrated into the turbomachine; an electric machine drivingly coupled to the spool and electrically coupled to the fuel cell assembly for receiving electrical power from the fuel cell assembly; and a controller operable with the fuel cell assembly, the electric machine, or both for modifying a power provided from the electric machine to the spool for dampening a resonant response of the spool during operation of the gas turbine engine.

The gas turbine engine of any preceding clause, wherein the engine dampening system comprises a sensor configured to sense data indicative of a speed of the spool, a vibration of the spool, or both, wherein the sensor is operably connected to the controller.

The gas turbine engine of any preceding clause, wherein the engine dampening system is configured to provide dampening at a frequency greater than about 7 kilohertz and less than about 14 kilohertz.

The gas turbine engine of any preceding clause, wherein the engine dampening system is configured to provide dampening at a frequency greater than about 50 hertz and less than about 1 kilohertz.

The gas turbine engine of any preceding clause, wherein the controller is configured to: receive data indicative of a spool parameter of the spool; and modify the power provided from the electric machine to the spool in response to the received data indicative of the spool parameter of the spool.

The gas turbine engine of any preceding clause, wherein the fuel cell assembly comprises a fuel cell defining an outlet in flow communication with the combustor for providing a flow of output products from the fuel cell to the combustor.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method of operating a gas turbine engine, the method comprising:
   providing a flow of a primary fuel to a combustor of a turbomachine, the turbomachine comprising a compressor, a turbine, and a spool rotatable with the compressor and the turbine;
   receiving data indicative of a spool parameter of the spool; and
   modifying a flow of a secondary fuel to the combustor in response to the received data indicative of the spool parameter of the spool, wherein modifying the flow of the secondary fuel to the combustor comprises modifying the flow of the secondary fuel to the combustor from a fuel cell assembly.

2. The method of claim 1, wherein the secondary fuel is different than the primary fuel.

3. The method of claim 1, wherein the secondary fuel has a higher specific heat than a specific heat of the primary fuel.

4. The method of claim 1, wherein the fuel cell assembly comprises a fuel processing unit and a fuel cell.

5. The method of claim 1, further comprising:
   modifying a power provided to the spool or a power extracted from the spool with an electric machine in response to the received data indicative of the spool parameter of the spool.

6. The method of claim 5, wherein modifying the power provided to the spool or a power extracted from the spool with the electric machine comprises modifying an amount of electric power provided to the electric machine from the fuel cell assembly.

7. The method of claim 1, wherein modifying the flow of the secondary fuel to the combustor comprises increasing the flow of the secondary fuel to the combustor to accelerate the spool through an engine resonance speed zone.

8. The method of claim 1, wherein modifying the flow of the secondary fuel to the combustor comprises reducing the flow of the secondary fuel to the combustor to decelerate the spool through an engine resonance speed zone.

9. The method of claim 1, wherein the spool parameter is a rotational speed of the spool, wherein the received data is data indicative of the spool parameter of the spool being within an engine resonance speed zone or of the spool parameter of the spool approaching the engine resonance speed zone.

10. The method of claim 9, further comprising:
determining a minimum time for the spool to achieve an undesired resonant response when defining a rotational speed within the engine resonance speed zone, and wherein modifying the flow of the secondary fuel to the combustor comprises modifying the flow of the secondary fuel to the combustor to accelerate or decelerate the spool through the engine resonance speed zone in an amount of time less than the minimum time.

11. The method of claim 1, wherein the spool parameter is a rotational speed of the spool, a vibration of the spool, or both.

12. A method of operating a gas turbine engine, the method comprising:
providing a flow of a primary fuel to a combustor of a turbomachine, the turbomachine comprising a compressor, a turbine, and a spool rotatable with the compressor and the turbine;
receiving data indicative of a spool parameter of the spool;
modifying a flow of a secondary fuel to the combustor in response to the received data indicative of the spool parameter of the spool, wherein the spool parameter is a rotational speed of the spool, wherein the received data is data indicative of the spool parameter of the spool being within an engine resonance speed zone or of the spool parameter of the spool approaching the engine resonance speed zone; and
determining a minimum time for the spool to achieve an undesired resonant response when defining a rotational speed within the engine resonance speed zone, and wherein modifying the flow of the secondary fuel to the combustor comprises modifying the flow of the secondary fuel to the combustor to accelerate or decelerate the spool through the engine resonance speed zone in an amount of time less than the minimum time.

* * * * *